United States Patent
Matsuyama et al.

(10) Patent No.: US 9,139,749 B2
(45) Date of Patent: *Sep. 22, 2015

(54) INK COMPOSITION, RECORDING METHOD, PRINTED MATTER, INK CARTRIDGE, AND INKJET RECORDING DEVICE

(71) Applicant: Ricoh Company, Ltd., Tokyo (JP)

(72) Inventors: Akihiko Matsuyama, Shizuoka (JP); Mitsuru Naruse, Shizuoka (JP); Masayasu Nonogaki, Shizuoka (JP); Minoru Hakiri, Shizuoka (JP); Keita Katoh, Shizuoka (JP); Kazukiyo Nagai, Shizuoka (JP); Yuusuke Koizuka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/025,241

(22) Filed: Sep. 12, 2013

(65) Prior Publication Data

US 2014/0092180 A1    Apr. 3, 2014

(30) Foreign Application Priority Data

Sep. 28, 2012    (JP) .................... 2012-217194

(51) Int. Cl.
   *C09D 11/322*    (2014.01)
   *C09D 11/326*    (2014.01)
   *B41J 2/175*    (2006.01)

(52) U.S. Cl.
   CPC .......... *C09D 11/322* (2013.01); *B41J 2/17503* (2013.01)

(58) Field of Classification Search
   CPC .................... C09D 11/322; C09D 11/326
   USPC .................... 106/31.75, 31.81, 31.86
   See application file for complete search history.

(56) References Cited

U.S. PATENT DOCUMENTS

| | | | |
|---|---|---|---|
| 4,003,886 A | 1/1977 | Muller | |
| 5,616,778 A | 4/1997 | Goldmann et al. | |

(Continued)

FOREIGN PATENT DOCUMENTS

| | | |
|---|---|---|
| DE | 10 2007 050 193 A1 | 4/2009 |
| GB | 2 239 254 A | 6/1991 |

(Continued)

OTHER PUBLICATIONS

Extended European Search Report issued Dec. 5, 2013 in Patent Application No. 13184573.7.

*Primary Examiner* — Helene Klemanski
(74) *Attorney, Agent, or Firm* — Oblon, McClelland, Maier & Neustadt, L.L.P.

(57) ABSTRACT

An ink composition contains a pigment represented by the following chemical formula 1; a hydrosoluble solvent; and water, wherein the pigment satisfies the following relation 1: $0.040 < Y/X < 0.200$ (Relation 1), where, in a CuKα X-ray diffraction spectrum having a wavelength of 1.541 Å, X represents a peak intensity at a Bragg ($2\theta \pm 0.2°$) angle in a range of $2\theta$ of from 26.5° to 27.5° and Y represents a peak intensity at a Bragg ($2\theta \pm 0.2°$) angle in a range of $2\theta$ of from 11.0° to 11.5°:

Chemical formula 1

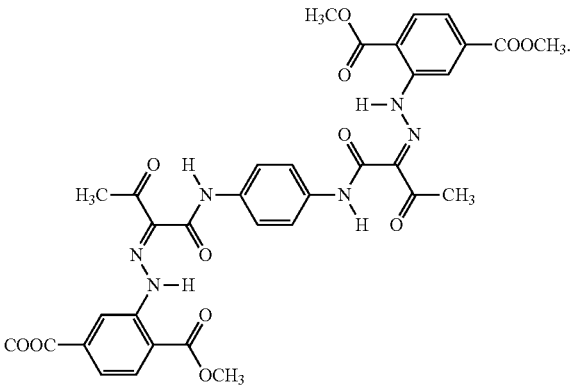

13 Claims, 5 Drawing Sheets

(56) References Cited

U.S. PATENT DOCUMENTS

| | | |
|---|---|---|
| 6,117,606 A | 9/2000 | Macholdt et al. |
| 2004/0171738 A1 | 9/2004 | Harz et al. |
| 2006/0229382 A1 | 10/2006 | Schweikart et al. |
| 2008/0233362 A1* | 9/2008 | Kato et al. ................. 106/31.77 |
| 2009/0246480 A1* | 10/2009 | Saito .......................... 428/195.1 |
| 2010/0029840 A1 | 2/2010 | Morimoto |
| 2011/0122180 A1 | 5/2011 | Cook et al. |
| 2012/0242741 A1 | 9/2012 | Hasegawa |
| 2012/0328854 A1 | 12/2012 | Matsuyama |
| 2013/0065028 A1* | 3/2013 | Fujii et al. .................. 428/195.1 |
| 2013/0071637 A1* | 3/2013 | Matsuyama et al. ........ 106/31.65 |
| 2013/0113860 A1* | 5/2013 | Gotou et al. ..................... 347/20 |
| 2013/0155145 A1* | 6/2013 | Gotou et al. ..................... 347/21 |
| 2014/0002539 A1* | 1/2014 | Goto et al. ................. 106/31.75 |
| 2014/0065386 A1* | 3/2014 | Matsuyama .................. 428/207 |

FOREIGN PATENT DOCUMENTS

| | | |
|---|---|---|
| JP | 2002-138233 | 5/2002 |
| JP | 2009-256611 | 11/2009 |
| WO | WO 2009/049758 A2 | 4/2009 |

\* cited by examiner

INK COMPOSITION, RECORDING METHOD, PRINTED MATTER, INK CARTRIDGE, AND INKJET RECORDING DEVICE

CROSS-REFERENCE TO RELATED APPLICATIONS

This patent application is based on and claims priority pursuant to 35 U.S.C. §119 to Japanese Patent Application No. 2012-217194, filed on Sep. 28, 2012, in the Japan Patent Office, the entire disclosure of which is hereby incorporated by reference herein.

BACKGROUND

1. Technical Field

The present invention relates to an ink composition, a recording method, a printed matter, an ink cartridge, and an inkjet recording device.

2. Background Art

Inkjet printers are widely used because they are relatively quiet and enjoy low running costs, and many printers capable of printing color images on plain paper are now widely available on market.

However, it is extremely difficult to satisfy all the requirements of images produced using such printers, such as good color reproducibility, abrasion resistance, durability, light resistance, drying property, feathering, color bleed, duplex printing, and ink discharging stability. As a result, the ink used is selected based on the particular application.

In general, ink used in inkjet recording is mainly composed of water, with a coloring agent and a hydrosoluble solvent such as glycerin to prevent clogging. As the coloring agent, dyes are widely used for their coloring and stability. However, the light resistance and water resistance of images produced using such dye-based ink are inferior. Water resistance can be improved to some degree by using specialized recording media having an ink absorbing layer, but is not satisfactory at all when it comes to plain paper.

To compensate for such defects, ink using a pigment has begun to be widely used as a coloring agent in recent years. Although pigment ink is successful and superior to dye ink with regard to light resistance, water resistance, etc., the coloring of the pigment ink is degraded by coherence of beams of light having different wavelengths and phases produced by multiple reflections of the beams of light within the pigment. For this reason, pigment ink is considered to be inferior to dye ink in general with regard to coloring.

In an attempt to compensate for degradation of coloring of such pigment ink, pigment particulates coated with a resin are used. According to this method, the resin further improves the fixing property and the gas resistance property of pigment ink and greatly contributes to the dispersion stability thereof. However, currently, pigment ink is not still on a par with dye ink with regard to gloss.

JP-2002-138233-A discloses a crystalline organic color pigment having a half value width of 0.4° or less at the maximum diffraction peak of a CuKα X-ray diffraction spectrum. Although this pigment is successful to some degree in improving the coloring thereof by reducing the half value width to improve the crystallinity of the pigment, that coloring is still unsatisfactory.

C.I. Pigment Yellow 155, which has a disazo skeleton represented by chemical formula 1 illustrated below, is widely used because of its excellent coloring and light resistance. However, being a pigment, coloring is still inferior to that of a dye.

One effort to improve coloring involves reducing the particle size of the pigment. Although successful in improving the transparency of the pigment, which contributes to improvement of gloss, the impact on coloring is still limited.

Chemical formula 1

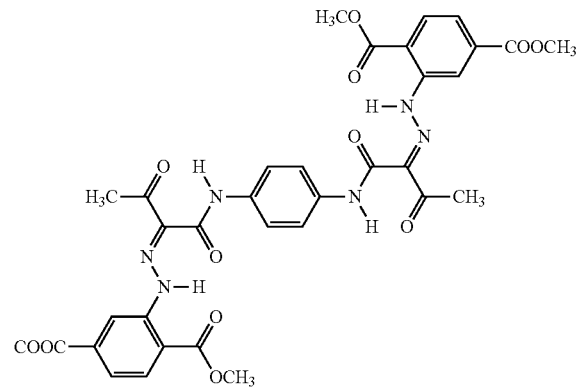

In addition, it is possible to make the coloring of a pigment closer to that of a dye by reducing the crystallinity of the pigment. However, if the pigment loses crystallinity and becomes non-crystal like a dye, pigment characteristics such as light resistance and gas resistance are drastically worsened. As a consequence, using such pigments is impractical.

SUMMARY

The present invention provides an improved ink composition which contains a pigment represented by the following chemical formula 1; a hydrosoluble solvent; and water. The pigment satisfies the following relation 1:0.040<Y/X<0.200 (Relation 1) where, in a CuKα X-ray diffraction spectrum having a wavelength of 1.541 Å, X represents a peak intensity at a Bragg (2θ±0.2°) angle in a range of 2θ of from 26.5° to 27.5° and Y represents a peak intensity at a Bragg (2θ±0.2°) angle in a range of 2θ of from 11.0° to 11.5°:

Chemical formula 1

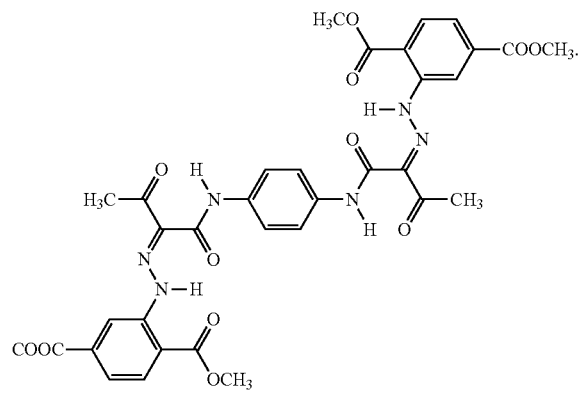

BRIEF DESCRIPTION OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DETAILED DESCRIPTION

Figure 1:
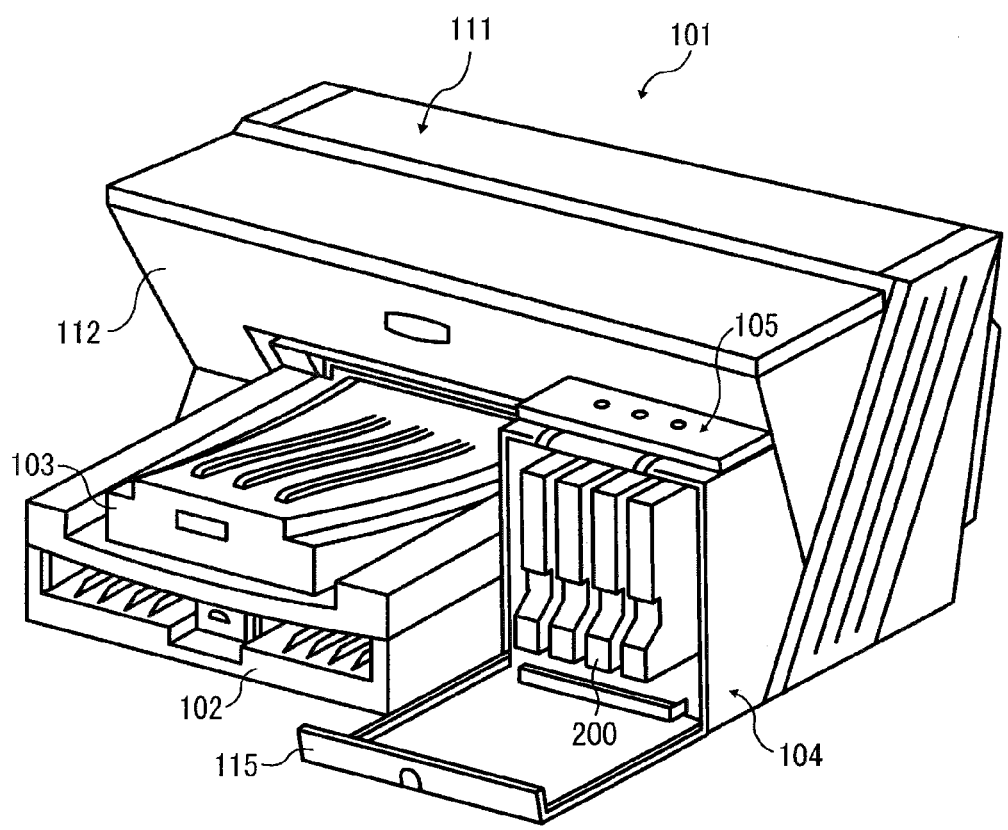
FIG. 1 is a perspective view illustrating an example of an inkjet recording device according to an embodiment of the present disclosure in which the cover of the ink cartridge installation unit is open.

The present disclosure provides an ink composition having improved coloring without degrading the light resistance thereof in comparison with conventional pigment.

The present inventors have found that the coloring of a pigment is improved if the crystallinity of the pigment is reduced while the light resistance of the pigment is prevented from deteriorating by maintaining the crystalline structure thereof.

In the present disclosure, coloring is improved by reducing the crystallinity of the pigment represented by the chemical formula 1 while maintaining the crystalline structure of the pigment to prevent degradation of the light resistance thereof.

"reducing the crystallinity of the pigment while maintaining the crystalline structure of the pigment" means that the peak having the maximum peak intensity is relatively high to the other peaks in an X-ray diffraction spectrum.

With regard to the pigment represented by Chemical formula 1 provided in the present disclosure, to the peak intensity X, which is the maximum peak in a diffraction angle $2\theta$ of from 26.5° to 27.5°, the intensities of peaks at other diffraction angles are lowered. In particular, in a CuKα X-ray diffraction spectrum having a wavelength of 1.541 Å, by limiting the peak intensity Y at a diffraction angle $2\theta$ of from 11.0° to 11.5° to satisfy the relation $1:0.040<Y/X<0.200$, the coloring is significantly improved.

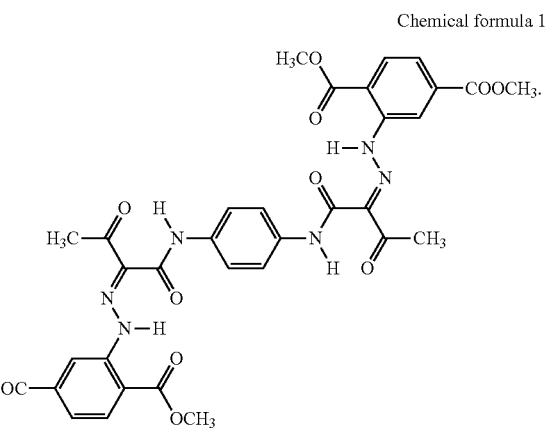

Chemical formula 1

A method of forming a pigment having a reduced crystallinity while maintaining the crystalline structure thereof is, for example, dissolving a pigment in an acid or a solvent temporarily and placing the thus-obtained solution in a poor solvent for re-crystallization.

In this method, to prevent crystals of the pigment from growing excessively, the pigment needs precipitating quickly in a small reaction field. However, in conventional methods, in which a solution of a pigment is dropped to a poor solvent being stirred, the size of a reaction field for precipitation is 1 cm or greater and the stirring speed is limited, under which crystals grow large. As a consequence, pigment particles having a reduced crystallinity are not formed.

However, a microreactor to precipitate dissolved pigments in minute reaction fields was developed recently, which makes it possible to precipitate pigment particles in minute reaction fields at a high speed while suppressing the growth of crystals.

In general, a microreactor is a reaction device to conduct mixing and precipitation for chemical reaction or material production in a micro space having sides of 1 mm or less.

Specific examples thereof include, but are not limited to, mikroSyn (manufactured by SIBATA SCIENTIFIC TECHNOLOGY LTD.) having minute pipes having a size of from 50 μm to 500 μm as a reaction field, MiChS System (manufactured by MiChS Co., Ltd.), and ULREA (manufactured by M Technique Co., Ltd.) having a forced ultra thin layer as a reaction field formed of a gap of from 1 μm to 30 μm between the two rotation disks.

In general, the efficiency of chemical reaction is determined by collision frequency and energy applied to the system. Since molecules and heat are not transferred far in a micro space, increasing the collision frequency of molecules and quick heat transfer are possible, which enables quick mixing, quick preparation, quick heat exchange, and quick diffusion.

Therefore, to prepare a pigment having a reduced crystallinity while maintaining the crystalline structure of the pigment, the reaction field is preferably 100 μm or less and more preferably 30 μm or less.

Organic solvents or acids can be used to dissolve the pigment represented by Chemical formula 1.

Specific examples of the organic solvent include, but are not limited to, dimethyl sulfoxide, 1-methyl-2-pyrrolidinone, 1,3-dimethyl-2-imidazolidinone, N,N-dimethyl formamide, and N,N-dimethyl acetamide.

These organic solvents have a low solubility of 1% by weight or less but this solubility is improved by making them strong alkali.

A specific example of preparing such a strong alkali organic solvent is dissolving sodium hydride, potassium hydride, etc. in alcohol such as methanol, ethanol, or isopropanol followed by mixing with the organic solvent mentioned above.

With regard to acids, strong acids such as strong sulfuric acid, hydrochloric acid, nitric acid, etc. can be used. However, since such a strong acid may sever the azo linking portion of the pigment represented by Chemical formula 1 and destroys the pigment, using the organic solvent mentioned above adjusted to be strong alkali is preferable to the acids.

The temperature of a pigment solution can be raised to the boiling point of a dissolved organic solvent or an acid at highest to increase the solubility of the pigment solution.

Specific examples of the poor solvent include, but are not limited to, water, methanol, ethanol, isopropanol, or liquid mixture in which methanol, ethanol, and/or isopropanol is dissolved in water.

If water or a liquid mixture of water and the alcohol mentioned above is cooled down to −20° C. to −50° C., the solvent may coagulate. Considering that the reaction is quick when the temperature difference between the pigment solution and the solvent is wide, it is preferable to use methanol, ethanol, or isopropanol that contains no water because these can be cooled down to lower temperatures.

The size and the crystallinity of pigment particles formed using a microreactor depend on the ratio the flow rate of a pigment solution to the flow rate of a poor solvent.

The ratio of the flow rate (ml/minute) of a pigment solution to the flow rate (ml/minute) of a poor solvent is preferably from 0.005 to 0.5 and more preferably from 0.01 to 0.1.

When the ratio is small, the reaction speed is high. That is, the crystallinity of pigments can be lowered.

When the ratio is smaller than, for example, 0.5, it is possible to form pigment particles having low crystallinity.

A ratio that is larger than, for example, 0.005, makes it easier to remove a solvent from pigment particles before collecting them.

Pigment particles that are dispersed in a liquid mixture of an acid and a poor solvent formed by a microreactor as described above are retrieved as a pigment paste after removing the acid and the solvent using a centrifugal followed by washing with deionized water several times.

Pigment

In the present disclosure, a disazo pigment represented by the chemical formula 1 is used, which is C.I. Pigment Yellow 155.

Chemical formula 1

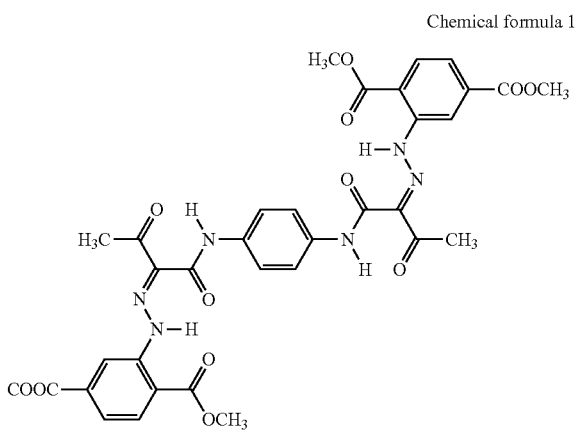

To obtain the ink composition of the present disclosure, the pigment crystal size is made smaller than that of conventional pigments to lower the crystallinity of the pigment. As described above, this is made possible by a microreactor to precipitate dissolved pigment in minute reaction fields.

The particle diameter of a pigment dispersed in the ink composition of the present disclosure is preferably from 30 nm to 150 nm.

The pigment particle diameter can be controlled within this range by using, for example, a mixing and kneading and dispersing machine using balls such as a bead mill or a ball mill, a mixing and kneading and dispersing machine using a shearing force such as a roll mill, or an ultrasonic dispersion machine.

In the present disclosure, an ultrasonic dispersion machine is particularly suitable. When the pigment particle diameter is, for example, 30 nm or greater, the light resistance of the pigment is improved, thereby reducing the change in color. This is advantageous for using a pigment.

In addition, when the pigment particle diameter is, for example, 150 nm or less, image gloss becomes high, which leads to production of images with good saturation and brightness.

The concentration of the pigment in the ink is preferably from 1% by weight to 15% by weight, more preferably from 2% by weight to 12% by weight, and furthermore preferably from 3% by weight to 9% by weight.

When the pigment concentration is, for example, 1% by weight or greater, coloring power becomes sufficient and images having a high saturation and a high image density are obtained.

In addition, when the pigment density is, for example, less than 15% by weight, the ink is stabilized for a long period of time.

Dispersing Agent

There is no specific limit to the dispersing agent for use in the present disclosure. The dispersing agent for use in preparation of the liquid dispersion of pigment can be selected based on the particular application.

Specific examples thereof include, but are not limited to, nonion surfactants such as polyoxyethylene isodecyl ether, polyoxyethylene lauryl ether, polyoxyethylene-β-naphtyl ether, polyoxy ethylene styryl phenyl ether, and polyoxy ethylene distyryl phenyl ether and anion surfactants such as polyoxyetheylene lauryl ether sulfate salts, polyoxyethylene-β-naphtyl ether sulfate salts, polyoxy ethylene styryl phenyl ether phosphorate salts, lauryl ether phosphorate salts, octyl ether carbonate salts, distyryl phenyl ether sulfate salts, styryl phenyl ether phosphorate salts, and β-naphtyl ether carbonate salts.

In the present disclosure, the dispersing agent represented by the chemical formula 2 illustrated below is particularly suitable because this dispersing agent can maintain the viscosity and the particle diameter of the pigment represented by the chemical formula 1 when it is dispersed, thereby highly stabilizing discharging of ink when the ink is used in an inkjet printer.

For example, the dispersing agents represented by the chemical formulae 2-1, 2-2, 2-3, and 2-4 shown in Table 1 are suitably usable.

Chemical formula 2

In the Chemical formula 2, $A^1$ represents a linear or branched alkyl group having 8 to 12 carbon atoms, a β-naphtyl group, a styrenized phenolic group, or a distyrenized phenolic group and $B^1$ represents a $COOM^1$, an $SO_3M^1$, or a $PO_3M^1_2$, where $M^1$ represents Na, K, tetramethyl ammonium, or ethanol amine.

TABLE 1

| Chemical formula | $A^1$ | $B^1$ | $M^1$ |
|---|---|---|---|
| 2-1 | β-naphthyl | $COOM^1$ | Tetramethyl ammonium |
| 2-2 | Distyrenized phenol | $SO_3M^1$ | K |
| 2-3 | Linear alkyl (C = 12) | $PO_3M^1{}_2$ | Na |
| 2-4 | Styrenized phenol | $COOM^1$ | Ethanol amine |

It is also possible to use polymer dispersing agents such as polyacrylic acids, polymethacrylic acids, copolymers of acrylic acid and acrylonitrile, copolymers of vinyl acetate and an acrylic acid ester, copolymers of acrylic acid and an acrylic acid alkyl ester, copolymers of styrene and acrylic acid, copolymers of styrene and methacrylic acid, copolymers of styrene, acrylic acid, and an acrylic acid alkyl ester, copolymers of styrene, methacrylic acid, and an acrylic acid alkyl ester, copolymers of styrene, α-methyl styrene, and an acrylic acid, copolymer of styrene, α-methyl styrene, and acrylic acid—copolymers of an acrylic acid alkyl ester, copolymers of styrene and maleic acid, copolymers of vinyl naphthalene and maleic acid, copolymers of vinyl acetate and vinyl ethylene, copolymers of vinyl acetate and aliphatic acid vinyl ethylene, copolymers of vinyl acetate and a maleic acid ester, copolymers of vinyl acetate and crotonic acid, copolymers of vinyl acetate and acrylic acid, copolymers of acrylic acid and silicone, and modified polyurethane resins.

These dispersing agents can be used alone or in combination.

In the present disclosure, the dispersing agent represented by the chemical formula 3 illustrated below is particularly suitable. Such a dispersing agent can be prepared by copolymerizing an acrylic monomer or a methcrylic monomer.

This dispersing agent can maintain the viscosity and the particle diameter of the pigment represented by the chemical formula 1 when it is dispersed, thereby highly stabilizing discharging of ink when the ink is used in an inkjet printer.

For example, the dispersing agent represented by the chemical formulae 3-1, 3-2, or 3-3 shown in Table 2 is suitably usable.

Chemical formula 3

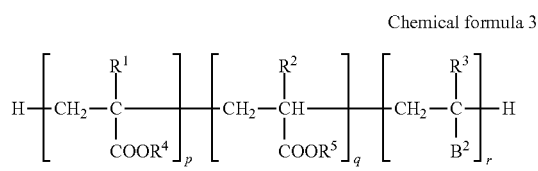

In the Chemical formula 3, $R^1$, $R^2$, and $R^3$ each, represent a hydrogen atom or a methyl group, $R^4$ and $R^5$ each, represent an $NH_2$ group, a benzyl group, and a stearyl group, p, q, and r each, represent integers of from 5 to 50, and $B^2$ represents a $COOM^2$ or an $SO_3M^2$, where $M^2$ represents Na, K, ammonium, tetramethyl ammonium, or ethanol amine.

TABLE 2

| Chemical formula | $B^2$ | $M^2$ | $R^1$ | $R^2$ | $R^3$ | $R^4$ | $R^5$ | p | q | r |
|---|---|---|---|---|---|---|---|---|---|---|
| 3-1 | $COOM^2$ | Tetra methyl ammonium | H | $CH_3$ | $CH_3$ | Benzyl | Stearyl | 25 | 25 | 25 |
| 3-2 | $COOM^2$ | Ethanol amine | $CH_3$ | $CH_3$ | H | $NH_2$ | Benzyl | 25 | 5 | 50 |
| 3-3 | $SO_3M^2$ | K | $CH_3$ | $CH_3$ | H | Stearyl | $NH_2$ | 5 | 50 | 50 |

A pigment dispersion element can be prepared by dissolving the dispersing agent mentioned above in an aqueous medium, adding the pigment to the solution followed by sufficient moistening, and mixing and kneading and dispersing the resultant by high speed stirring by a homogenizer, a disperser using balls such as a bead mill and a ball mill, a mixing and kneading disperser using a shearing force such as a roll mill, or an ultrasonic disperser.

However, after such a dispersion process, coarse particles are contained in most cases, which easily clog in the inkjet nozzle or the supplying route. Therefore, it is suitable to remove such coarse particles (e.g., particle diameter: 1 μm or greater) by a filter or a centrifugal.

In the present disclosure, it is preferable to use the dispersing agent in an amount of from 10% by weight to 100% by weight and, more preferable, from 20% by weight to 50% by weight to the pigment.

When the blending ratio is, for example, 10% by weight or greater, the pigment particles can be finely dispersed.

When the blending ratio is, for example, 100% by weight or less, the dispersing agent is adsorbed to the surfaces of pigment particles effectively, thereby improving the preservability of ink so that bleed-free images can be printed.

In addition, the content of the dispersed particulate in the ink is preferably from about 2% by weight to about 20% by weight and more preferably from 3% by weight to 15% by weight based on the total amount of the pigment and the dispersing agent.

In addition, in the present disclosure, it is possible to impart dispersability to a pigment by using a self-dispersing type pigment or a polymer coated pigment particle described below together or instead of a dispersing agent.

Self-Dispersing Type Pigment

In the present disclosure, pigment particles having hydrophilicitized surfaces can be used.

The surface of pigment particles can be treated by a known method such as oxidation treatment, azo reaction, plasma treatment, etc.

By the surface treatment, hydrophillic groups such as a carbonyl group, a carboxylic group, a hydroxyl group, or a sulfone group can be introduced into the surface of a pigment particle to disperse the pigment particles in an aqueous medium.

Polymer Coated Pigment

A known method of dispersing pigments in an aqueous system is encapsulating the pigments in polymer particulates.

Specific examples of the polymers forming polymer emulsions include, but are not limited to, vinyl-based polymers, polyester-based polymers, and polyurethane-based polymers. In particular, the polymers specified in JP-2000-53897-A and JP-2001-139489-A can be suitably used. Among these, vinyl-based polymers and polyester-based polymers are preferable in particular.

Polyester-based Polymer

Polyester-based polymers are made of a polycarboxylic acid and a polyalcohol.

Specific examples of the polycarboxylic acids include, but are not limited to, aromatic dicarboxylic acids such as terphthalic acid, isophthalic acid, orthophthalic acid, 1,5-npahthalene diacarboxylic acid, 2,6-naphthalene dicarboxylic acid, diphenic acid, sulfoterephthalic acid, 5-sulfoisophthalic acid, hexahydro phtalic anhydride, 4-sulfophthalic acid, 4-sulfonaphthalene-2,7-dicarboxylic acid, 5,[4-sulfophenoxy]isophthalic acid, and sulfoterephthalic acid; aliphatic dicarboxylic acids such as succinic acid, adipic acid, azelaic acid, sebacic acid, and dodecane dicarboxylic acid; aromatic oxy carboxylic acids, alicyclic dicarboxylic acids, and tri- or higher carboxylic acids.

Specific examples of the polyols include, but are not limited to, aliphacic polyols such as ethylene glycol, propylene glycol, 1,3-propane diol, 2,3-butane diol, 1,4-butane diol, 1,5-pentane diol, 1,6-hexane diol, neopenthyl glycol, diethylene glycol, dipropylene glycol, 2,2,4-trimethyl-1,3-pantane diol, polyethylene glycol, polypropylene glycol, polytetramethylene glycol, trimethylol ethane, trimethylol propane, glycerine, pentaerythritol, 1,4-cyclohexane diol, 1,4-cyclohexane dimethanol, spiroglycol, tricyclo decane diol, tricyclodecane dimetanol, methaxylene glycol, orthoxylene glycol, 1,4-phenylene glycol, bisphenol A, and lactone-based polyester polyols; alicyclic polyols and aromatic polyols.

Vinyl-based Polymer

There is no specific limit to the vinyl-based polymer. For example, vinyl-based polymers obtained from the following polymerizable monomers can be used.

As the polymerizable monomers, specific examples thereof include, but are not limited to, vinyl-based aromatic hydrocarbons such as styrene, o-methyl styrene, m-methyl styrene, p-methyl styrene, α-methyl styrene, p-ethyl styrene, 2,4-dimethyl styrene, p-tert-butyl styrene, p-chloro styrene, and divinyl benzene; (meth)acrylates such as methyl acrylate, ethyl acrylate, butyl acrylate, n-propyl acrylate, isopropyl acrylate, n-butyl acrylate, isobutyl acrylate, t-butyl acrylate, n-pentyl acrylate, isopentyl acrylate, neopentyl acrylate, 3-(methyl)butyl acrylate, 2-ethylhexyl acrylate, cyclohexyl acrylate, hexyl acrylate, octyl acrylate, nonyl acrylate, decyl acrylate, undecyl acrylate, dodecyl acrylate, phenyl acrylate, methyl methacrylate, n-propyl methacrylate, isopropyl methacrylate, n-butyl methacrylate, isobutyl methacrylate, t-butyl methacrylate, n-pentyl methacrylate, isopentyl methacrylate, neopentyl methacrylate, 3-(methyl)butyl methacrylate, 2-ethyl hexyl methacrylate, hexyl methacrylate, octyl methacrylate, nonyl methacrylate, decyl methacrylate, undecyl methacrylate, and dodecyl methacrylate; unsaturated carboxylic acids such as acrylic acid, methacrylic acid, itaconic acid, and maleic acid; (meth)acrylic acmide, N-substituted maleimide, maleic anhydride, (meth)acrylonitrile, vinyl ketone, vinyl acetate, and vinilydene chloride. Also, resins formed by the polymerizable monomer alone or in combination can be used.

Polymer Particulate

In the present disclosure, microcapsulation to coat organic pigment particles with hydrophilic polymers or emulsification of the pigment particles can be suitably employed for dispersion in an aqueous medium.

Any known method can be employed to conduct the microcapsulation or emulsification.

Specific examples thereof include, but are not limited to, chemical manufacturing methods, physically manufacturing methods, physically-chemically manufacturing methods and mechanical methods.

Specific examples of such methods include, but are not limited to:

Acid deposition methods which include: neutralizing at least part of the anionic group of an organic polymer compound having an anionic group by a basic compound to impart water solubility to the organic polymer compound; kneading the organic polymer compound with a coloring material in an aqueous medium; neutralizing or acidizing the resultant with an acid compound to precipitate the organic compound; fixating the precipitated organic compound to the coloring material; and neutralizing the resultant for dispersion;

Phase-transfer emulsification methods which include: pouring water to an organic solvent phase, which is a mixture of an aniocnic organic polymer having a dispersion ability against water and a coloring material or pouring the organic solvent phase to water;

Interfacial polymerization methods, which include: dissolving two kinds of monomers or reactants in a dispersion phase and a continuous phase separately; and reacting both materials at the interface thereof to form a wall film;

In-situ polymerization methods, which include: supplying a liquid monomer or gas monomer and a catalyst or two kinds of reactive materials from one of the continuous phase nuclear particle sides to conduct reaction to form a wall film;

Submerged cured coated film methods, which include: making droplets of a polymer solution containing core material particles insoluble in the solution by a curing agent to form a wall film;

Coacervation (phase separation) methods which include: separating a polymer liquid dispersion in which core material particles are dispersed into a coacervate (condensed phase) having a high concentration of polymer and a diluted phase to form a wall film;

Solvent evaporation methods which include: preparing liquid in which a core material is dispersed in a solution of a wall film material; placing this liquid dispersion in liquid in which a continuous phase of the liquid dispersion is not mixable to obtain a complex emulsion; and gradually removing a medium that dissolves the wall film material to form a wall film;

Fusion distribution cooling methods which include: heating and liquidizing a wall film material that is liquidized by heating and solidified at room temperature; dispersing core material particles in the wall film material; and microparticulating the resultant followed by cooling down to form a wall film;

Air suspension coating methods which include: suspending core material particle powder in air by a fluidizing bed; spraying and mixing coating liquid of a wall film material while floating the core material particle powder in the air to form a wall film; and Spray drying methods, which include: spraying encapsulated undiluted solution to contact heated air; and sufficiently drying the volatile portions to form a wall film.

Phase-transfer emulsification methods, acid deposition methods, and interfacial polymerization methods are used for inkjet in particular.

Polymer particulates exhibit excellent water-dispersibility all the more when the particulates have ionic groups on the surface thereof.

Specific examples of such ionic groups include, but are not limited to, a sulfonic acid group, a carboxylic acid group, a sulfuric acid group, a phosphoric acid group, a phosphine acid group, alkali metal basic groups or ammonium basic groups thereof, and primary to tertiary amine groups. A carboxylic acid alkali metal basic group, a carboxylic acid ammonium basic group, a sulphonic acid alkali metal basic group, and a sulfonic acid ammonium basic group are preferable. A sulphonic acid alkali metal basic group and a sulfonic acid ammonium basic group are preferable in particular in terms of the stability of aqueous dispersion.

The ionic group is introduced by adding a monomer having an ionic group when synthesizing a resin.

Specific examples of salts include, but are not limited to, ammonium-based ions, Li, Na, K, Mg, Ca, Cu, and Fe. Li, Na, and K are preferable in particular.

Hydrosoluble Solvent

The ink of the present disclosure is prepared by using water as a liquid medium.

The following hydrosoluble solvents are used to prevent ink from drying, improve dispersion stability, and prevent curling of plain paper.

These hydrosoluble solvents can be used alone or in combination.

Specific examples thereof include, but are not limited to the following:

polyols such as glycerine, ethylene glycol, diethylene glycol, isopropylidene glycerol, 1,3-butane diol, 3-methyl-1,3-butane diol, trimethylol propane, trimethylol ethane, ethylene glycol, diethylene glycol, dipropylene glycol, tripropylene glycol, tetraethylene glycol, triethylene glycol, propylene glycol, dipropylene glycol, hexylene glycol, polyethylene glycol, polypropylene glycol, 1,5-pentane diol, 1,6-hexane diol, glycerol, 1,2,6-hexane triol, 1,2,4-butane triol, 1,2,3-butane triol, and petriol; polyol alkyl ethers such as ethylene glycol monoethyl ether, ethylene glycol monobutyl ether, diethylene glycol monometyl ether, diethylene glycol monoetyl ether, diethylene glycol monobutyl ether, tetraethylene glycol monometyl ether, and propylene glycol monoethyl ether; polyol aryl ethers such as ethylene glycol monophenyl ether, and ethylene glycol monobenzyl ether; nitrogen-containing heterocyclic compounds such as 2-pyrolidone, N-methyl-2-pyrolidone, N-hydroxyethyl-2-pyrolidone, 1,3-dimethyl imidazolidinone, ε-caprolactone, and γ-butyrolactone; amides such as formamide, N-methylformamide, N,N-dimethylformamide, N,N-dimethyl-β-methoxy propionamide, and N,N-dimethyl-β-butoxy propionamide; amines such as monoethanol amine, diethanol amine, triethanol amine, monoethyl amine, diethyl amine, and triethyl amine; sulfur-containing compounds such as dimethyl sulfoxide, sulfolane, and thiodiethanol; 3-ethyl-3-hydroxymethyl oxetane, propylene carbonate, and ethylene carbonate.

Among these hydrosoluble solvents, 3-ethyl-3-hydroxymethyloxetane, isopropylidene glycerol, N,N-dimethyl-β-methoxy propionamide, and N,N-dimethyl-β-butoxy propionamide are preferable in particular. These are excellent to prevent curling of plain paper.

Sugar groups can be also contained as a hydrosoluble solvent in the present disclosure.

Specific examples of the sugar groups include, but are not limited to, monosaccharides, disaccharides, oligosaccharides (including trisaccharides and tetrasaccharides), and polysaccharides.

Preferred specific examples thereof include, but are not limited to, glucose, mannose, fructose, ribose, xylose, arabinose, galactose, maltose, cellobiose, lactose, saccharose, trehalose, and maltotriose.

Polysaccharides represent sugar in a broad sense and are materials that are present widely in nature, for example, α-cyclodextrine and cellulose.

Specific examples of derivatives of these sugar groups include, but are not limited to, reducing sugars, oxidized sugars, amino acid, and thio acid for the sugar groups specified above.

Sugar alcohols are particularly preferable and specific examples thereof include, but are not limited to, maltitol and sorbit.

The blending ratio of the pigment and the hydrosoluble solvent has a large impact on the discharging stability of ink discharged from a head.

If the blending amount of the hydrosoluble solvent is too small while the ratio of the solid pigment portion is high, water evaporation around ink meniscus of nozzles tends to be accelerated, resulting in poor discharging performance.

The blending ratio of the hydrosoluble agents is preferably from 10% by weight to 70% by weight and more preferably from 20% by weigh to 50% by weight based on the entire ink.

The ink having such a range of the blending ratio is extremely good about drying property, a preservation test, and a reliability test.

Penetrating Agent

By adding a penetrating agent to ink, the surface tension lowers so that the filling property of the ink to the nozzles and stability of discharging ink ameliorate. In addition, since the ink droplets quickly penetrate into a recording medium after the ink droplets have landed thereon, feathering and color bleed are reduced.

Surfactants and solvents having a penetrating property are used as the penetrating agent.

Surfactants are classified into anionic surfactants, nonionic surfactants, and ampholytic surfactants by hydrophilic group or fluorine-based surfactants, acetylene-based surfactants, etc. by hydrophobic group.

Specific examples of the anionic surfactants include, but are not limited to, polyoxyethylene alkyl ether acetates, dodecyl benzene sulfonates, laurates, and polyoxyethylene alkyl ether sulfates.

Specific examples of the nonionic surfactants include, but are not limited to, polyols, glycol ethers, polyoxyethylene alkyl ethers, polyoxyethylene alkyl esters, polyoxy ethylene sorbitan aliphatic esters, polyoxyethylene alkyl phenyl ethers, polyoxyethylene alkyl amines, polyoxyethylene alkyl amides, and acetylene glycol.

Specific examples of the fluorine-based surfactants include, but are not limited to, perfluoroalkyl sulfonic acid salts, perfluoroalkyl carboxylic acid salts, perfluoroalkyl phosphoric acid esters, adducts of perfluoroalkyl ethylene oxide, perfluoro alkyl betaine, perfluoro alkyl amine oxide, and perfluoro alkyl ether compounds. Among these, the fluoroine-based surfactants represented by Chemical formula 5 are particularly preferably used.

Chemical formula 5

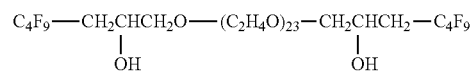

Specific examples of the acetylene glycol-based surfactants include, but are not limited to, acetylene glycols such as 2,4,7,9-tetramethyl-5-desine-4,7-diol, 3,6-dimethyl-4-octine-3,6-diol, and 3,5-dimethyl-1-hexine-3-ol {(for example, SURFYNOL® 104, 82, 465, 485, and TG, manufactured by AIR PRODUCTS and CHEMICALS, INC. (US)}. Among these, SURFYNOL® 104, 465, and TG are particularly good to demonstrate good printing quality.

Specific examples of the solvents having a penetrating property include, but are not limited to, polyols having eight or more carbon atoms such as 2-ethyl-1,3-hexane diol, and 2,2,4-trimethyl-1,3-pentane diol and glycol ethers.

These surfactants may be used alone or in combination.

In the present disclosure, it is preferable to use a penetrating agent in an amount of from 0.01% by weight to 5% weight and, more preferable, from 0.03% weight to 2% weight based on the entire ink.

When the content of a surfactant is too small, spreading of dots after printing tends to be poor, i.e., resulting in dots having small diameters so that filling-in in a solid image is not good, thereby degrading the image density and color saturation.

When the content of the surfactant is too large, the ink tends to foam, which leads to clogging in the flowing path in a nozzle, resulting in prevention of discharging ink.

Known additives such as pH control agents, anti-septic and anti-fungal agents, anti-corrosion agents, anti-oxidants, ultraviolet absorbers, oxygen absorbers, light stabilizers, and anti-kogation agents can be optionally added to the ink composition of the present disclosure.

pH Control Agent pH control agents are added to stabilize the dispersion state and ink discharging by maintaining the ink in the state of alkali.

However, inkjet heads and ink supplying units tend to be easily dissolved in a large amount in pH 11 or higher, which results in modification, leakage, poor discharging performance of ink, etc.

It is more desirable to add a pH control agent when a pigment is mixed and kneaded and dispersed together with a dispersing agent in water than when additives such as a hydrosoluble solvent and a penetrating agent are added after mixing, kneading, and dispersing.

This is because depending on the pH control agent, dispersion may be broken.

It is preferable that the pH control agent contains at least one of an alcohol amine, an alkali metal hydroxide, an ammonium hydroxide, a phosphonium hydroxide, and a carbonate of an alkali metal. Specific examples of the alcohol amines include, but are not limited to, diethanol amine, triethanol amine, and 2-amino-2-ethyl-1,3-propane diol.

Specific examples of the alkali metal hydroxides include, but are not limited to, lithium hydroxide, sodium hydroxide, and potassium hydroxide.

Specific examples of the ammonium hydroxides include, but are not limited to, ammonium hydroxide, quaternary ammonium hydroxide, and quaternary phosphonium hydroxide.

Specific examples of the carbonate of an alkali metal include, but are not limited to, lithium carbonate, sodium carbonate, and potassium carbonate.

Anti-septic and Anti-fungal Agent

Specific examples of the anti-septic and anti-fungal agents include, but are not limited, dehydrosodium acetate, sodium sorbinate, 2-pyridine thiol-1-oxide sodium, sodium benzoate, and pentachlorophenol sodium.

Anti-corrosion Agent

Specific examples of the anti-corrosion agents include, but are not limited to, acid sulfite, thiosodium sulfate, ammonium thiodiglycolate, diisopropyl ammonium nitrite, pentaerythritol quaternary nitride, and dicyclohexyl ammonium nitrite.

Anti-oxidant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Ultraviolet Absorber

Specific examples of the ultraviolet absorbers include, but are not limited to, benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

Anti-kogation Agent

Anti-kogation agents can be added to the recording liquid of the present disclosure.

Kogation is a problematic phenomenon occurring to a thermal head that discharges ink (recording liquid) by a foaming force of the ink generated when the ink is heated instantly by an electric current flowing in a heater. Upon this instant heating, the ink compositions are modified and the modified ink compositions adhere to the heater.

Specific examples of the anti-kogation agents include, but are not limited to, polyphosphoric acid, polyamino carboxylic acid, aldonic acid, hydroxy carboxylic acid, polyol phosphoric acid esters, and salts thereof, acids having an amino group and salts thereof, and ammonium salts of acids having a methyl group or a methylene group and a carboxylic group.

Recording Method

The present disclosure provides an inkjet recording method having an excellent ink discharging stability by applying mechanical energy or thermal energy to the ink composition of the present disclosure.

Recording Device

The ink composition of the present disclosure can be used in recording systems employing an inkjet recording system such as printers, facsimile machines, photocopiers, multi-functional machines (serving as a printer, a facsimile machine, and a photocopier) for inkjet recording in particular.

Inkjet recording devices, which were used in Examples described later, are described below.

An inkjet recording device 101 illustrated in FIG. 1 has a sheet feeder tray 102 to feed recording media placed in the inkjet recording device 101, a discharging tray 103 installed in the inkjet recording device 101, which stores the recording media on which images are recorded (formed), and an ink cartridge installation unit 104.

On the upper surface of the ink cartridge installation unit 104 is arranged an operating portion 105 including operation keyboard, a display, etc.

The ink cartridge installation unit 104 has a front cover 115 that is openable and closable to detach and attach an ink cartridge 200.

111 represents the upper cover of the inkjet recording device 101 and 112 represents the front surface thereof.

Figure 2:
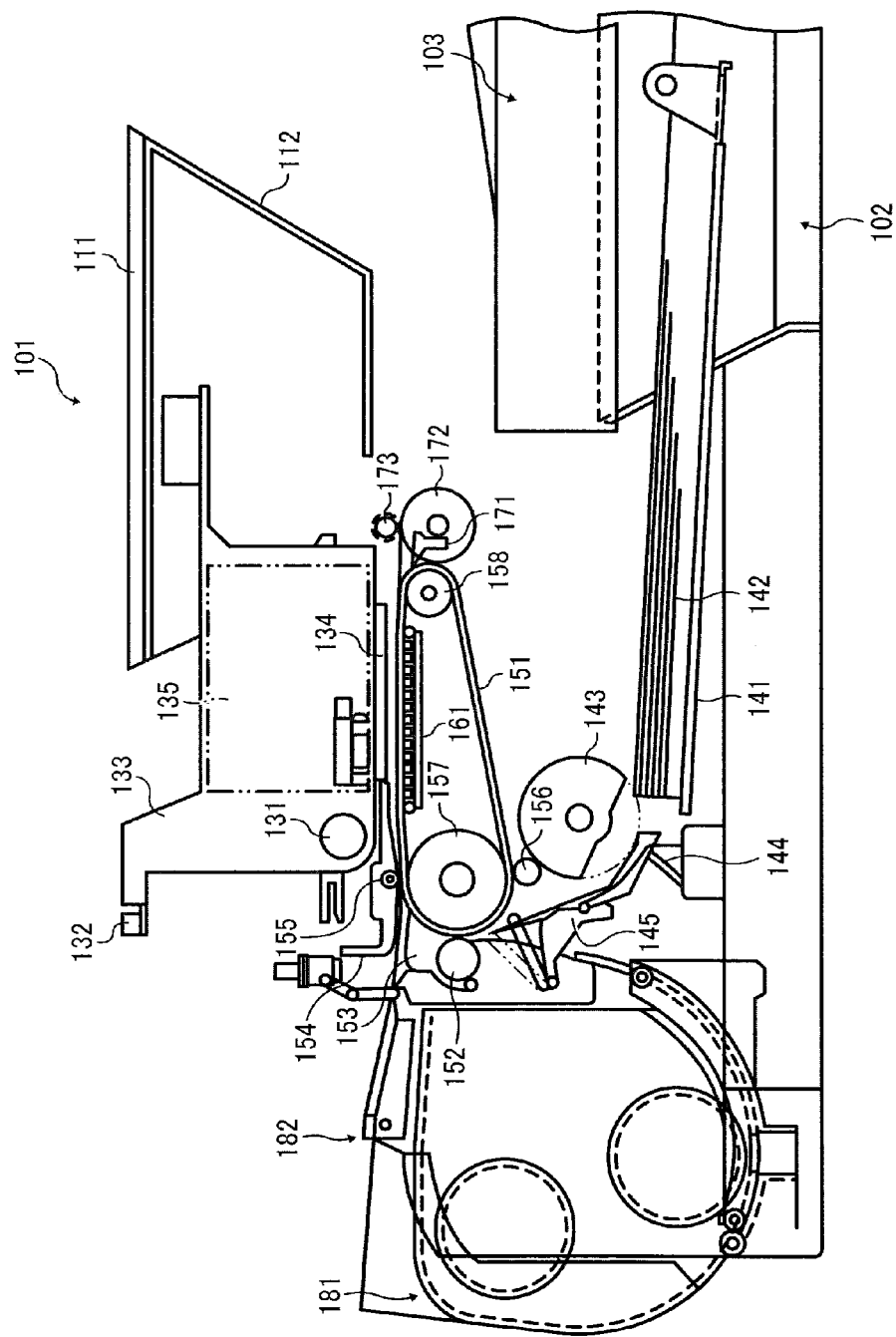
FIG. 2 is a schematic diagram illustrating the entire configuration of the inkjet recording device according to an embodiment of the present disclosure.

Inside the inkjet recording device 101, as illustrated in FIG. 2, a guide rod 131 and a stay 132 serving as guiding members that laterally bridge side plates provided on the right side and left side hold a carriage 133 slidably movable in the main scanning direction. A main scanning motor moves the carriage 133 for scanning.

The carriage 133 has a recording head 134 having four inkjet recording heads that discharge ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having an energy-generating device to discharge ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

The carriage 133 has a sub tank 135 for each color to supply each color ink to the recording head 134.

The ink composition of the present disclosure is supplied and replenished to the sub-tank 135 from the ink cartridge 200 mounted onto the ink cartridge inserting installation unit 104 via a tube for supplying ink.

A sheet feeding unit to feed a sheet 142 loaded on a sheet loader (pressure plate) 141 of the sheet feeder tray 103 includes a roller (sheet feeding roller 143) having a half-moon like form to separate and feed the sheet 142 one by one from the sheet loader 141 and a separation pad 144 that is made of a material having a large friction index and arranged facing the sheet feeding roller 143 while biased to the side of the sheet feeding roller 143.

A transfer unit to transfer the sheet 142 fed from the sheet feeding unit on the lower side of the recording head 134 includes a transfer belt 151 to electrostatically adsorb and transfer the sheet 142, a counter roller 152 to transfer the sheet 142 fed from the sheet feeding unit via a guide 145 while pinching the sheet 142 with the transfer belt 151, a transfer guide 153 to make the sheet 142 track on the transfer belt 151 by changing the transfer direction of the sheet 142 being sent substantially vertically upward by substantially 90°, a front end pressure roller 155 biased towards the transfer belt 151 by a pressure member 154, and a charging roller 156 to charge the surface of the transfer belt 151.

The transfer belt 151 is an endless form belt, stretched between a transfer roller 157 and a tension roller 158 and rotatable in the belt transfer direction.

This transfer belt 151 include, for example, a top layer serving as a sheet adsorption surface made of a resin material such as a copolymer (ETFE) of tetrafluoroethylene and ethylene with no resistance control treatment while having a thickness about 40 μm, and a bottom layer (moderate resistance layer, earth layer) made of the same material as the top layer with resistance control treatment with carbon.

On the rear side of the transfer belt 151, a guiding member 161 is arranged corresponding to the printing area by the recording head 134.

A discharging unit to discharge the sheet 142 on which images are recorded by the recording head 134 includes a separation claw 171 to separate the sheet 142 from the transfer belt 151, a discharging roller 172, and a discharging roller 173. A discharging tray 103 is arranged below the discharging roller 172.

A duplex printing sheet feeding unit 181 is detachably attached to the rear side of the inkjet recording device 101.

The duplex printing sheet feeding unit 181 takes in and reverses the sheet 142 that is returned by the reverse rotation of the transfer belt 151 and feeds it again between the counter roller 152 and the transfer belt 151.

A manual sheet feeding unit 182 is provided on the upper surface of the duplex printing sheet feeding unit 181.

In this inkjet recording device, the sheet 142 is separated and fed from the sheet feeding unit one by one substantially vertically upward, guided by the guide 145, and transferred while being pinched between the transfer belt 151 and the counter roller 152.

Furthermore, the front end of the sheet 142 is guided by the transfer guide 153 and pressed against the transfer belt 151 by the front end pressure roller 155 to change the transfer direction by substantially 90°.

Since the transfer belt 157 is charged by the charging roller 156 at this point in time, the sheet 142 is electrostatically adsorbed to the transfer belt 151 and transferred.

By driving the recording head 134 according to the image signal while moving the carriage 133, the ink droplet is discharged to the sheet 142 not in motion to record an image for an amount corresponding to one line and thereafter the sheet 142 is transferred in a predetermined amount to conduct recording for the next line.

On receiving a signal indicating that the recording has completed or the rear end of the sheet 142 has reached the image recording area, the recording operation stops and the sheet 142 is discharged to the discharging tray 103.

When the amount of ink for inkjet recording remaining in the sub-tank 135 is detected as "approaching to empty", a predetermined amount of the ink is replenished to the sub tank 135 from the ink cartridge 200.

In this inkjet recording device, it is possible to dissemble the chassis of the ink cartridge 200 and replace the ink bags therein when the ink for inkjet is used up in the ink cartridge 200.

In addition, the ink cartridge 200 stably supplies the ink even when the ink cartridge 200 is placed upright (on its side) and installed by front loading.

Therefore, even when the upside of the main part 101 is blocked, for example, it is accommodated in a rack or something is placed on the upper surface of the main part 101, the ink cartridge 200 is easily exchanged.

A serial type (shuttle type) in which the carriage scans is used in this description but this is true in a line-type inkjet recording device having a line type head.

Ink Cartridge

Each ink constituting the ink set can be used in an ink cartridge and any other suitable member can be used in combination.

There is no specific limit to the container. Any form, any structure, any size, and any material can be suitably selected. For example, an ink bag formed of aluminum laminate film, a resin film, etc. can be suitably used as a container.

Next, the ink cartridge is described in detail with reference to FIGS. 3 and 4.

Figure 3:
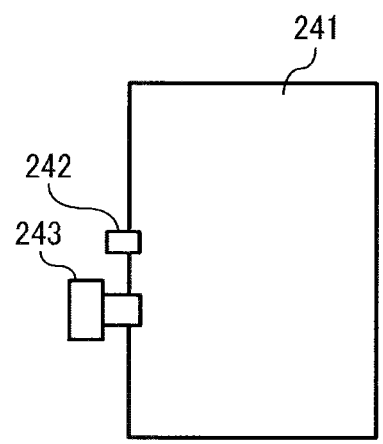
FIG. 3 is a schematic diagram illustrating an example of the ink bag of the ink cartridge according to an embodiment of the present disclosure.

FIG. 3 is a schematic diagram illustrating an example of an ink bag 241 of the ink cartridge of the present disclosure. FIG. 4 is a schematic diagram illustrating the ink cartridge 200 that accommodates the ink bag of FIG. 3 in a cartridge case 244.

As illustrated in FIG. 3, an ink bag 241 is filled with the ink from an ink inlet 242. Subsequent to evacuation of air, the ink inlet 242 is closed by fusion.

When in use, the ink is supplied by piercing the needle attached to the inkjet recording device into an ink outlet 243 made of rubber.

The ink bag 241 is formed of a packaging material such as aluminum laminate film having no air permeability.

Figure 4:
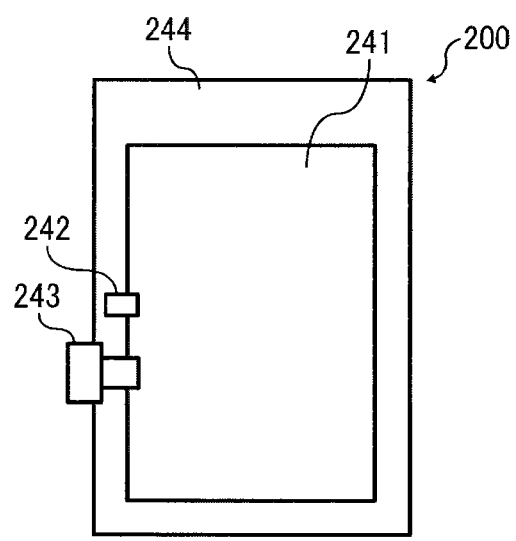
FIG. 4 is a schematic diagram illustrating an example of the ink cartridge according to an embodiment of the present disclosure that accommodates the ink bag illustrated in FIG. 3 in the cartridge case.

The ink bag 241 is accommodated in a cartridge case 244 made of plastic as illustrated in FIG. 4 and detachably attachable to an inkjet recording device as the ink cartridge 200.

It is particularly preferable that the ink cartridge of the present disclosure is detachably attachable to the inkjet recording device of the present disclosure.

Having generally described preferred embodiments of this invention, further understanding can be obtained by reference to certain specific examples, which are provided herein for the purpose of illustration only and are not intended to be limiting. In the descriptions in the following examples, the numbers in parts represent weight ratios in parts unless otherwise specified.

EXAMPLES

Example 1

Dispersion Element 1

Using a microreactor (ULREA, manufactured by M Technique Co., Ltd.), methanol at −20° C. was flown in a flowing amount rate of 400 ml/min. into the thin-layer reactor thereof sandwiched by rotation disks; a solution in which 20 parts of a pigment (Ink Jet Yellow 4G, manufactured by Clariant Japan K.K.) represented by the Chemical formula 1 was dissolved in a mixture of 49 parts of 0.1 normal potassium hydroxide, 147 parts of ethanol, and 784 parts of dimethyl sulfoxide; and this solution was kept at 25° C. and flown into the same rotation disks at a flowing amount rate of 10 ml/min. to precipitate pigment particles;

The thus-obtained pigment liquid dispersion was condensed by a centrifugal and diluted with deionized water repeatedly to adjust the pH of the resultant to be around 8 to obtain a pigment paste having a pigment concentration of 30% by weight;

Thereafter, 6 parts of a dispersing agent represented by the Chemical formula 3-1 was dissolved in 44 parts of deionized water followed by mixing with 50 parts of the pigment paste prepared as described above; The thus-obtained resultant was subject to one-hour treatment by an ultrasonic homogenizer to obtain Dispersion Element 1 having a pigment concentration of 15% by weight.

Ink Recipe
Dispersion Element 1: 30.0 parts
Glycerin: 20.0 parts
3-ethyl-3-hydroxymethyl oxetane: 10.0 parts
N,N-dimethyl-β-methoxy propion amide: 15.0 parts
2-ethyl-1,3-hexane diol: 2.0 parts
Surfactant represented by the Chemical formula 5: 0.05 parts
2-amino-2-ethyl-1,3-propane diol: 0.5 parts
Anti-septic and anti-fungal agents (Proxel™ LV, manufactured by ARCH CHEMICALS JAPAN, INC.): 0.1 parts
Deionized water: 22.35 parts Manufacturing a vehicle by dissolving the materials mentioned above other than the Dispersion Element 1 in deionized water, the vehicle was mixed with the Dispersion Element 1 and the mixture was filtrated by a filter having an opening of 1 μm to obtain ink of Example 1.

Example 2

A pigment paste having a pigment concentration of 30% by weight was prepared in the same manner as in Example 1 except that the pigment was changed to TONER YELLOW 3GP (manufactured by Clariant Japan K.K.) represented by the Chemical formula 1 illustrated above.

A Dispersion Element 2 having a pigment concentration of 15% by weight was manufactured in the same manner as in Example 1 except that the dispersing agent of Example 1 was changed to the dispersing agent represented by the Chemical formula 3-2.

Ink Recipe
Dispersion Element 2: 30.0 parts
Glycerin: 20.0parts
1,3-butane diol: 10.0 part
Isopropylidene glycerol: 10.0 parts
N,N-dimethyl-β-butoxy propionamide: 5.0 parts
2-ethyl-1,3-hexane diol: 2.0 parts
Surfactant represented by the Chemical formula 5: 0.05 parts
2-amino-2-ethyl-1,3-propane diol: 0.5 parts
Anti-septic and anti-fungal agents (Proxel™ LV, manufactured by ARCH CHEMICALS JAPAN, INC.): 0.1 parts
Deionized water: 22.35 parts Manufacturing a vehicle by dissolving the materials mentioned above other than the Dispersion Element 1 in deionized water, the vehicle was mixed with the Dispersion Element 2 and the mixture was filtrated by a filter having an opening of 1 μm to obtain Ink of Example 2.

Example 3

Dispersion Element 3

A pigment paste having a pigment concentration of 30% by weight was prepared in the same manner as in Example 1 except that the pigment was changed to PIGMENT YELLOW 4G (manufactured by HANGZHOU DIMACHEMA IMP&EXP CO., LTD.) represented by the Chemical formula 1 illustrated above.

Dispersion Element 3 having a pigment concentration of 15% by weight was manufactured in the same manner as in Example 1 except that the dispersing agent was changed to the dispersing agent represented by the Chemical formula 3-3 and the processing time of the ultrasonic homogenizer was changed to 30 minutes.

Ink Recipe
Dispersion Element 3: 30.0 parts
Glycerin: 20.0 parts
Ethylene glycol monobutyl ether: 10.0 parts
3-ethyl-3-hydroxymethyl oxetane: 10.0 parts
N,N-dimethyl-β-butoxy propionamide 5.0 parts
2-ethyl-1,3-hexane diol: 2.0 parts
EMALGEN LS-106 (polyoxyethylene polyoxypropylene alkyl ether, manufactured by KAO CORPORATION): 1.0 part
2-amino-2-ethyl-1,3-propane diol: 0.5 parts
Anti-septic and anti-fungal agents (Proxel™ LV, manufactured by ARCH CHEMICALS JAPAN, INC.): 0.1 parts
Deionized water: 21.4 parts Manufacturing a vehicle by dissolving the materials mentioned above other than the Dispersion Element 3 in deionized water, the vehicle was mixed with the Dispersion Element 3 and the mixture was filtrated by a filter having an opening of 1 μm to obtain ink of Example 3.

Example 4

Dispersion Element 4

A pigment paste having a pigment concentration of 30% by weight was prepared in the same manner as in Example 1 except that the flowing amount rate of the pigment solution flowing into the rotation disks of the microreactor (ULREA) was changed to 5 ml/min.

Thereafter, 6 parts of a styrene acrylic resin (JONCRYL® 683, manufactured by BASF Japan LTD.) was dissolved in 44 parts of 0.01 normal aqueous sodium hydroxide. The solution was mixed with 50 parts of the pigment paste followed by treatment by an ultrasonic homogenizer for 30 minutes to obtain Dispersion Element 4 having a pigment concentration of 15% by weight.

Ink Recipe
Dispersion Element 4: 30.0 parts
Glycerin: 20.0 parts 2-pyrolidone: 10.0 parts
3-methyl-1,3-butane diol: 15.0 parts
2-ethyl-1,3-hexane diol: 2.0 parts
Surfactant represented by the Chemical formula 5: 0.05 parts
2-amino-2-ethyl-1,3-propane diol: 0.5 parts
Anti-septic and anti-fungal agents (Proxel™ LV, manufactured by ARCH CHEMICALS JAPAN, INC.): 0.1 parts
Deionized water: 22.35 parts Manufacturing a vehicle by dissolving the materials mentioned above other than the Dispersion Element 4 in deionized water, the vehicle was mixed with the Dispersion Element 4 and the mixture was filtrated by a filter having an opening of 1 µm to obtain ink of Example 4.

Example 5

Dispersion Element 5

A pigment paste having a pigment concentration of 30% by weight was prepared in the same manner as in Example 1 except that the pigment was changed to TONER YELLOW 3GP (manufactured by Clariant Japan K.K.) represented by the Chemical formula 1 and the flowing amount rate of the pigment solution flowing into the rotation disks of the microreactor (ULREA) was changed to 20 ml/min.

A Dispersion Element 5 having a pigment concentration of 15% by weight was manufactured in the same manner as in Example 1 except that the dispersing agent of Example 1 was changed to the dispersing agent represented by the Chemical formula 2-1.

Ink Recipe
Dispersion Element 5: 30.0 parts
Glycerin: 20.0 parts
1,3-butane diol: 25.0 part
2-ethyl-1,3-hexane diol: 2.0 parts
Surfactant represented by the Chemical formula 5: 0.05 parts
2-amino-2-ethyl-1,3-propane diol: 0.5 parts
Anti-septic and anti-fungal agents (Proxel™ LV, manufactured by ARCH CHEMICALS JAPAN, INC.): 0.1 parts
Deionized water: 22.35 parts Manufacturing a vehicle by dissolving the materials mentioned above other than the Dispersion Element 5 in deionized water, the vehicle was mixed with the Dispersion Element 5 and the mixture was filtrated by a filter having an opening of 1 µm to obtain Ink of Example 5.

Example 6

Dispersion Element 6

A pigment paste having a pigment concentration of 30% by weight was prepared in the same manner as in Example 1 except that the pigment was changed to PIGMENT YELLOW 4G (manufactured by HANGZHOU DIMACHEMA IMP&EXP CO., LTD.) represented by the Chemical formula 1 and the flowing amount rate of the pigment solution flowing into the rotation disks of the microreactor (ULREA) was changed to 5 ml/min.

Dispersion Element 6 having a pigment concentration of 15% by weight was manufactured in the same manner as in Example 1 except that the dispersing agent was changed to the dispersing agent represented by the Chemical formula 2-2 and the processing time of the ultrasonic homogenizer was changed to 30 minutes.

Ink Recipe
Dispersion Element 6: 30.0 parts
Glycerin: 20.0 parts
1,3-butane diol: 15.0 part
3-methyl-1,3-butane diol: 10.0 parts
2-ethyl-1,3-hexane diol: 2.0 parts
EMALGEN LS-106 (polyoxyethylene polyoxypropylene alkyl ether, manufactured by KAO CORPORATION): 1.0 part
2-amino-2-ethyl-1,3-propane diol: 0.5 parts
Anti-septic and anti-fungal agents (Proxel™ LV, manufactured by ARCH CHEMICALS JAPAN, INC.): 0.1 parts
Deionized water: 21.4 parts Manufacturing a vehicle by dissolving the materials mentioned above other than the Dispersion Element 6 in deionized water, the vehicle was mixed with the Dispersion Element 6 and the mixture was filtrated by a filter having an opening of 1 µm to obtain Ink of Example 6.

Example 7

Dispersion Element 7

Using the same pigment paste as in Example 2, a Dispersion Element 7 having a pigment concentration of 15% by weight was manufactured in the same manner as in Example 2 except that the dispersing agent was changed to the dispersing agent represented by the Chemical formula 2-3 and the treatment time of the ultrasonic homogenizer was changed to 30 minutes.

Ink Recipe
Dispersion Element 7: 30.0 parts
Glycerin: 20.0 parts
Ethylene glycol monobutyl ether: 5.0 parts
1,3-butane diol: 20.0 part
2-ethyl-1,3-hexane diol: 2.0 parts
Surfactant represented by the Chemical formula 5: 0.05 parts
2-amino-2-ethyl-1,3-propane diol: 0.5 parts
Anti-septic and anti-fungal agents (Proxel™ LV, manufactured by ARCH CHEMICALS JAPAN, INC.): 0.1 parts
Deionized water: 22.35 parts Manufacturing a vehicle by dissolving the materials mentioned above other than the Dispersion Element 7 in deionized water, the vehicle was mixed with the Dispersion Element 7 and the mixture was filtrated by a filter having an opening of 1 µm to obtain Ink of Example 7.

Example 8

Dispersion Element 8

Using the same pigment paste as in Example 1, a Dispersion Element 8 having a pigment concentration of 15% by weight was manufactured in the same manner as in Example 1 except that the dispersing agent was changed to the dispersing agent represented by the Chemical formula 2-4 and the treatment time of the ultrasonic homogenizer was changed to 30 minutes.

Ink Recipe
Dispersion Element 8: 30.0 parts
Glycerin: 20.0 parts
Ethylene glycol monobutyl ether: 10.0 parts
Isopropylidene glycerol: 5.0 parts
N,N-dimethyl-β-butoxy propionamide 10.0 parts
2-ethyl-1,3-hexane diol: 2.0 parts
EMALGEN LS-106 (polyoxyethylene polyoxypropylene alkyl ether, manufactured by KAO CORPORATION): 1.0 part
2-amino-2-ethyl-1,3-propane diol: 0.5 parts
Anti-septic and anti-fungal agents (Proxel™ LV, manufactured by ARCH CHEMICALS JAPAN, INC.): 0.1 parts
Deionized water: 21.4 parts Manufacturing a vehicle by dissolving the materials mentioned above other than the Dispersion Element 12 in deionized water, the vehicle was mixed with the Dispersion Element 8 and the mixture was filtrated by a filter having an opening of 1 μm to obtain Ink of Example 8.

Example 9

Dispersion Element 9

A pigment paste having a pigment concentration of 30% by weight was prepared in the same manner as in Example 1 except that the pigment was changed to PIGMENT YELLOW 4G (manufactured by HANGZHOU DIMACHEMA IMP&EXP CO., LTD.) represented by the Chemical formula 1 and the flowing amount rate of the pigment solution flowing into the rotation disks of the microreactor (ULREA) was changed to 30 ml/min.

A Dispersion Element 9 having a pigment concentration of 15% by weight was manufactured in the same manner as in Example 1 except that the dispersing agent of Example 1 was changed to the dispersant represented by the Chemical formula 4-1.

$C_{18}H_{35}$—O—$(C_2H_4O)_{20}$—$SO_3Na$     Chemical formula 4-1

Ink Recipe

Dispersion Element 9: 30.0 parts

Glycerin: 20.0 parts 2-pyrolidone: 5.0 parts 3-ethyl-3-hydroxymethyl oxetane: 10.0 parts N,N-dimethyl-β-butoxy propionamide 10.0 parts 2-ethyl-1,3-hexane diol: 2.0 parts EMALGEN LS-106 (polyoxyethylene polyoxypropylene alkyl ether, manufactured by KAO CORPORATION): 1.0 part 2-amino-2-ethyl-1,3-propane diol: 0.5 parts Anti-septic and anti-fungal agents (Proxel™ LV, manufactured by ARCH CHEMICALS JAPAN, INC.): 0.1 parts Deionized water: 21.4 parts Manufacturing a vehicle by dissolving the following materials other than the Dispersion Element 9 having the following recipe in deionized water, the vehicle was mixed with the Dispersion Element 9 followed by filtration by a filter having an opening of 1 μm to obtain Inkjet Ink of Example 9.

Example 10

Dispersion Element 10

A pigment paste having a pigment concentration of 30% by weight was prepared in the same manner as in Example 1 except that the pigment was changed to TONER YELLOW 3GP (manufactured by Clariant Japan K.K.) represented by the Chemical formula 1 and the flowing amount rate of the pigment solution flowing into the rotation disks of the microreactor (ULREA) was changed to 30 ml/min.

A Dispersion Element 10 having a pigment concentration of 15% by weight was manufactured in the same manner as in Example 1 except that the dispersing agent of Example 1 was changed to the dispersant represented by the Chemical formula 4-2.

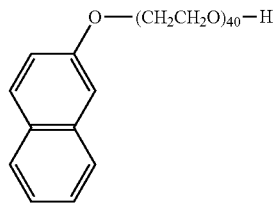

Chemical Structure 4-2

Dispersion Element 10: 30.0 parts

Glycerin: 20.0 parts 2-pyrolidone: 5.0 parts 1,3-butane diol: 10.0 part 3-methyl-1,3-butane diol: 10.0 parts 2-ethyl-1,3-hexane diol: 2.0 parts Surfactant represented by the Chemical formula 5: 0.05 parts 2-amino-2-ethyl-1,3-propane diol: 0.5 parts Anti-septic and anti-fungal agents (Proxel™ LV, manufactured by ARCH CHEMICALS JAPAN, INC.): 0.1 parts Deionized water: 22.35 parts Manufacturing a vehicle by dissolving the materials mentioned above other than the Dispersion Element 10 in deionized water, the vehicle was mixed with the Dispersion Element 10 and the mixture was filtrated by a filter having an opening of 1 μm to obtain Ink of Example 10.

Example 11

Dispersion Element 11

150 parts of the pigment paste obtained in Example 1 was mixed in 400 ml of sulfolane and the mixture was placed in Ultra Aspec Mill UAM 015 type (manufactured by KOTOBUKI INDUSTRIES CO., LTD.) for one-hour dispersion. Thereafter, 15 parts of amide sulfate was added followed by stirring at 140° C. to 150° C. for 10 hours.

The thus-obtained slurry was placed in 1,000 ml of deionized water to obtain a pigment paste having a sulfonized surface by a centrifugal.

This pigment paste was re-dispersed in 2,000 ml of deionized water followed by adjustment of the pH by lithium hydroxide. The resultant was subject to desalting concentration by an ultrafiltration membrane to obtain Dispersion Element 11 having a pigment concentration of 15% by weight.

Ink Recipe

Dispersion Element 11 30.0 parts

Glycerin: 20.0 parts 3-ethyl-3-hydroxymethyl oxetane: 10.0 parts

N,N-dimethyl-β-methoxy propionamide: 10.0 parts

N,N-dimethyl-β-butoxy propionamide: 5.0 parts 2-ethyl-1,3-hexane diol: 2.0 parts EMALGEN LS-106 (polyoxyethylene polyoxypropylene alkyl ether, manufactured by KAO CORPORATION): 1.0 part 2-amino-2-ethyl-1,3-propane diol: 0.5 parts Anti-septic and anti-fungal agents (Proxel™ LV, manufactured by ARCH CHEMICALS JAPAN, INC.): 0.1 parts Deionized water: 21.4 parts Manufacturing a vehicle by dissolving the materials mentioned above other than the Dispersion Element 11 in deionized water, the vehicle was mixed with the Dispersion Element 11 and the mixture was filtrated by a filter having an opening of 1 μm to obtain Ink of Example 11.

Example 12

(1) Synthesis of Polymer b
Material 1 for Polymer b
Styrene: 11.2 parts
Acrylic acid: 2.8 parts
Lauryl methacrylate: 12.0 parts
Polyethylene glycol methacrylate: 4.0 parts
Styrene macromer (AS-6, manufactured by TOAGOSEI CO., LTD.): 4.0 parts
Mercapto ethanol: 0.4 parts After sufficient replacement with nitrogen gas in a flask equipped with a mechanical stirrer, a thermometer, a nitrogen gas introducing tube, a reflux tube, and a dripping funnel, the Material 1 for Polymer b was placed therein followed by heating to 65° C.

Material 2 for Polymer b
Styrene: 100.8 parts
Acrylic acid: 25.2 parts
Lauryl methacrylate: 108.0 parts
Polyethylene glycol methacrylate: 36.0 parts
Hydroxy ethyl methacrylate: 60.0 parts
Styrene macromer (AS-6, manufactured by TOAGOSEI CO., LTD.): 36.0 parts
Mercapto ethanol: 3.6 parts
Azobis dimethyl valero nitrile: 2.4 parts
Methylethylketone: 18.0 parts Thereafter, the liquid mixture of the material 2 was dripped in 2.5 hours to the liquid mixture of material 1 in the heated flask.

After dripping, a liquid mixture of 0.8 parts of azobis dimethyl valeronitrile and 18.0 parts of methylethyl ketone was dropped to the flask in half an hour.

Subsequent to one-hour aging at 65° C., 0.8 parts of azobisdimethyl valeronitrile was added thereto followed by one-hour aging.

After the reaction was complete, 364.0 parts of methylethyl ketone was added to the flask to obtain 800 parts of Polymer b (vinyl resin) solution having a concentration of 50% by weight.

Dispersion Element 12
Pigment paste prepared in Example 3: 50.0 parts
Polymer b solution: 12.0 parts
1 mol/l potassium hydroxide aqueous solution: 14.0 parts
Methylethylketone: 20.0 parts
Deionized water: 30.0 parts After mixing the pigment paste prepared in Example 3 with the polymer b solution followed by sufficient stirring, the mixture was kneaded 20 times with a three-roll mill (NR-84A, manufactured by Noritake Co., Ltd.).

The thus-obtained paste was placed in 200 parts of deionized water. Subsequent to sufficient stirring, methylethyl ketone was distilled away by an evaporator to obtain a Dispersion Element 12 having a pigment concentration of 15%.

Ink Recipe
Dispersion Element 12: 30.0 parts
Glycerin: 20.0 parts
3-methyl-1,3-butane diol: 25.0 parts
2-ethyl-1,3-hexane diol: 2.0 parts
EMALGEN LS-106 (polyoxyethylene polyoxypropylene alkyl ether, manufactured by KAO CORPORATION): 1.0 part
2-amino-2-ethyl-1,3-propane diol: 0.5 parts
Anti-septic and anti-fungal agents (Proxel™ LV, manufactured by ARCH CHEMICALS JAPAN, INC.): 0.1 parts
Deionized water: 21.4 parts Manufacturing a vehicle by dissolving the materials mentioned above other than the Dispersion Element 12 in deionized water, the vehicle was mixed with the Dispersion Element 12 and the mixture was filtrated by a filter having an opening of 1 μm to obtain Ink of Example 12.

Comparative Example 1

Dispersion Element 13

6 parts of the dispersing agent represented by the chemical formula 2-4 for use in Example 8 was dissolved in 79 parts of deionized water. Thereafter, this solution was mixed with 15 parts of the pigment Ink Jet Yellow 4G (manufactured by Clariant Japan, K.K.) represented by the chemical formula 1 for use in Example 8. The resultant was placed in Ultra Aspec Mill UAM 015 type (manufactured by KOTOBUKI INDUSTRIES CO., LTD.) for one hour dispersion followed by filtration by a filter having an opening of 1 μm to obtain a Dispersion Element 13 having a pigment concentration of 15% by weight.

Ink Recipe

Ink for inkjet recording was manufactured in the same manner as in Example 8 except that the Dispersion Element 8 was changed to the Dispersion Element 13.

Comparative Example 2

Dispersion Element 14

6 parts of the dispersing agent represented by the chemical formula 3-3 for use in Example 3 was dissolved in 79 parts of deionized water. Thereafter, this solution was mixed with 15 parts of PIGMENT YELLOW 4G (manufactured by HANGZHOU DIMACHEMA IMP&EXP CO., LTD.) represented by the chemical formula 1 for use in Example 3. The resultant was placed in Ultra Aspec Mill UAM 015 type (manufactured by KOTOBUKI INDUSTRIES CO., LTD.) for 0.5 hour dispersion to obtain a Dispersion Element 14 having a pigment concentration of 15% by weight.

Ink Recipe

Ink for inkjet recording was manufactured in the same manner as in Example 3 except that the Dispersion Element 3 was changed to the Dispersion Element 14.

Comparative Example 3

Dispersion Element 15

A pigment paste having a pigment concentration of 30% by weight was prepared in the same manner as in Example 10 except that the flowing amount rate of methanol at −20° C. serving as a poor solvent flowing into the thin layer reactor sandwiched by the rotation disks of the microreactor (ULREA) was changed to 50 ml/min.

Next, the Dispersion Element 15 having a pigment concentration of 15% by weight was prepared in the same manner and the materials as in Example 10.

Ink Recipe

Inkjet ink was obtained in the same manner as in Example 10 except that the Dispersion Element 10 of Example 10 was changed to the Dispersion Element 15.

The hydrosoluble solvents, penetrating agents, etc. for use in Examples and Comparative Examples described above are shown in Table 3.

TABLE 3

| Ink | Dispersion element | Hydrosoluble solvent | | | | | | | | |
|---|---|---|---|---|---|---|---|---|---|---|
| | | GLY | BGMBE | 2P | 13BD | MBD | EHO | IPG | DMPA | DBPA |
| Example 1 | 30 | 20 | | | | | 10 | | 15 | |
| Example 2 | 30 | 20 | | | 10 | | | 10 | | 5 |
| Example 3 | 30 | 20 | 10 | | | | 10 | | | 5 |
| Example 4 | 30 | 20 | | 10 | | 15 | | | | |
| Example 5 | 30 | 20 | | | 25 | | | | | |
| Example 6 | 30 | 20 | | | 15 | 10 | | | | |
| Example 7 | 30 | 20 | 5 | | 20 | | | | | |
| Example 8 | 30 | 20 | 10 | | | | | 5 | 10 | |
| Example 9 | 30 | 20 | | 5 | | | 10 | | | 10 |
| Example 10 | 30 | 20 | | 5 | 10 | 10 | | | | |
| Example 11 | 30 | 20 | | | | | 10 | | 10 | 5 |
| Example 12 | 30 | 20 | | | | 25 | | | | |
| Comparative Example 1 | 30 | 20 | 10 | | | | | 5 | 10 | |
| Comparative Example 2 | 30 | 20 | 10 | | | | 10 | | | 5 |
| Comparative Example 3 | 30 | 20 | | 5 | 10 | 10 | | | | |

| Ink | Penetrating agent | | | pH control agent | Anti-septic and anti-fungal agent LV | Deionized water |
|---|---|---|---|---|---|---|
| | 2E13HD | LS | DSN | AEPD | | |
| Example 1 | 2 | | 0.05 | 0.5 | 0.1 | 22.35 |
| Example 2 | 2 | | 0.05 | 0.5 | 0.1 | 22.35 |
| Example 3 | 2 | 1 | | 0.5 | 0.1 | 21.40 |
| Example 4 | 2 | | 0.05 | 0.5 | 0.1 | 22.35 |
| Example 5 | 2 | | 0.05 | 0.5 | 0.1 | 22.35 |
| Example 6 | 2 | 1 | | 0.5 | 0.1 | 21.40 |
| Example 7 | 2 | | 0.05 | 0.5 | 0.1 | 22.35 |
| Example 8 | 2 | 1 | | 0.5 | 0.1 | 21.40 |
| Example 9 | 2 | 1 | | 0.5 | 0.1 | 21.40 |
| Example 10 | 2 | | 0.05 | 0.5 | 0.1 | 22.35 |
| Example 11 | 2 | 1 | | 0.5 | 0.1 | 21.40 |
| Example 12 | 2 | 1 | | 0.5 | 0.1 | 21.40 |
| Comparative Example 1 | 2 | 1 | | 0.5 | 0.1 | 21.40 |
| Comparative Example 2 | 2 | 1 | | 0.5 | 0.1 | 21.40 |
| Comparative Example 3 | 2 | | 0.05 | 0.5 | 0.1 | 22.35 |

The unit of the compounds in Table 3 is parts by weight.
Abbreviations shown in Table 3 represent as follows:
GLY: glycerin
EGMBE: ethylene glycol monobutyl ether
2P: 2-pyrroridone
13 BD: 1,3-butane diol
MBD: 3-methyl-1,3-butane diol
EHO: 3-ethyl-3-hydroxymethyl oxetane
IPG: isopropylidene glycerol
DMPA: N,N-dimethyl-β-methoxy propionamide
DBPA: N,N-dimethyl-β-buthoxy propionamide
2E13HD: 2-ethyl-1,3-hexane diol
LS: EMALGEN LS-106 (polyoxyethylene polyoxypropylene alkyl ether, manufactured by KAO CORPORATION)
DSN: surfactant represented by chemical formula 4
AEPD: 2-amino-2-ethyl-1,3-propane diol
LV: Anti-septic and anti-fungal agents (Proxel ™ LV, manufactured by ARCH CHEMICALS JAPAN, INC.)

The evaluation items and the evaluation methods for the dispersion elements and inkjet ink manufactured in Examples and Comparative Examples are described below.

(1) Measuring of X Ray Diffraction Spectrum

To measure X-ray diffraction spectra of the pigments prepared in Examples and Comparative Examples, X'Pert Pro (manufactured by PANalytical Co.) was used.

sing a Cu enclosure tube (Kα characteristic X-ray: wavelength of 1,541 Å) as an X-ray generator, the measuring was conducted under the conditions of a measuring range 2θ of from 3.0° to 35.0°, a sampling width of 0.02°, and a cumulative time of 1.0 second.

With regard to the pigments of Examples and Comparative Example 3, pigment powder was prepared by removing moisture from the pigment pastes before dispersion with a reduced pressure while heating the pastes to 50° C. for measuring.

With regard to the pigments of Comparative Examples 1 and 2, the pigment powder before dispersion was used for measuring.

Figure 6:
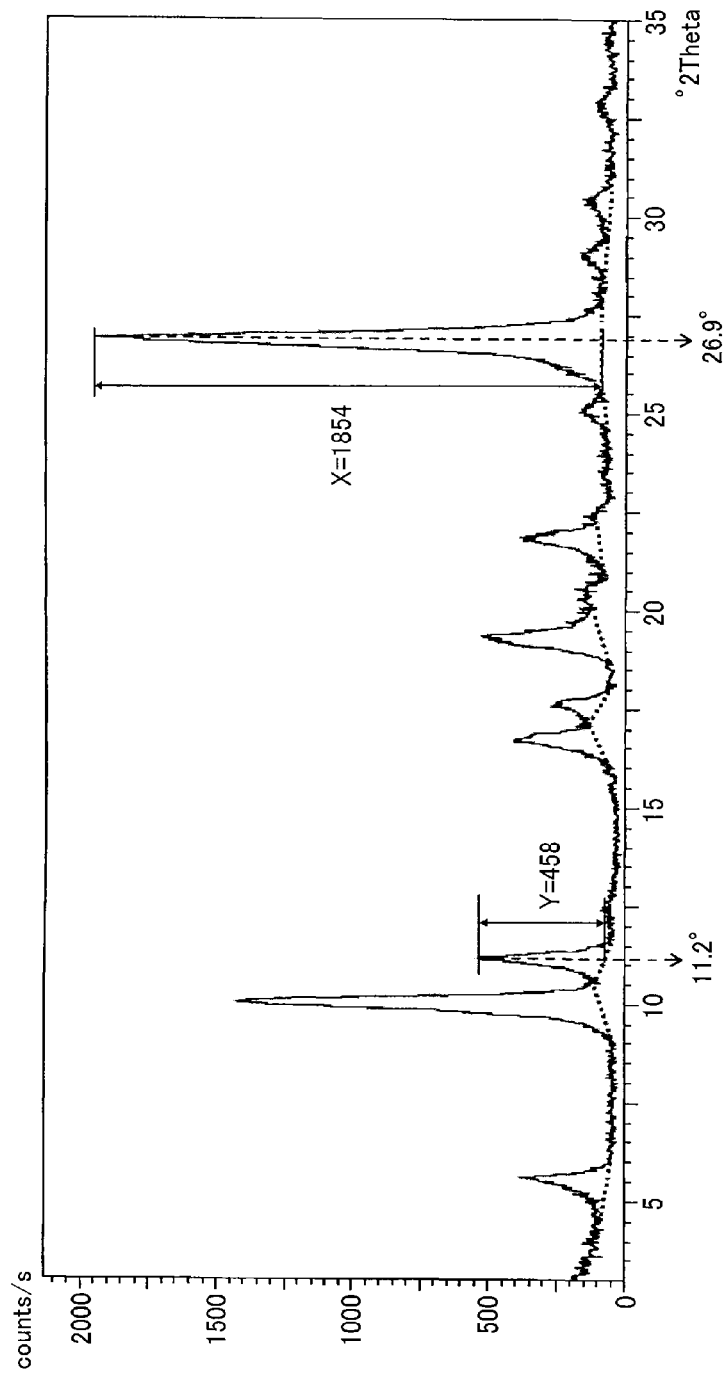
FIG. 6 is a schematic diagram illustrating how the peak intensity is obtained from X-ray diffraction spectrum of Comparative Example 1.

IG. 5 is an X-ray diffraction spectrum of Example 1 and FIG. 6 is an X-ray diffraction spectrum of Comparative Example 1.

Figure 5:
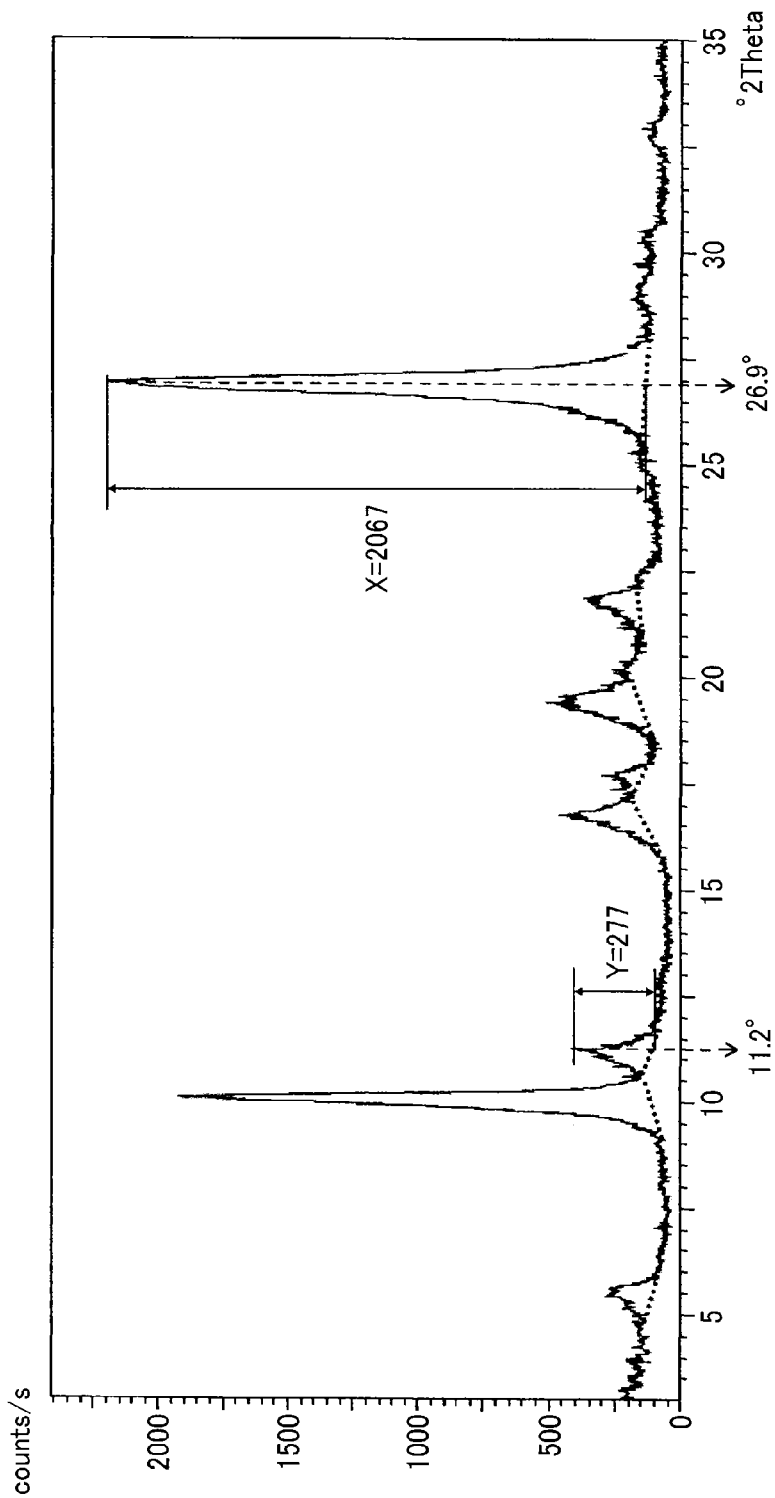
FIG. 5 is a schematic diagram illustrating how the peak intensity is obtained from the X-ray diffraction spectrum of Example 1.

As illustrated in FIG. 5, the peak intensities X and Y ascribable to the crystalline portion are obtained from the obtained X-ray diffraction spectrum based on the halo portion ascribable to the non-crystalline portion as the base.

X, Y and the results of Y/X are shown in Table 4.

TABLE 4

| | Y/X | Peak X | | Peak Y | |
|---|---|---|---|---|---|
| | | 2θ | X | 2θ | Y |
| Example 1 | 0.134 | 26.9 | 2067 | 11.2 | 277 |
| Example 2 | 0.104 | 27.0 | 1980 | 11.4 | 205 |
| Example 3 | 0.102 | 26.8 | 1860 | 11.1 | 189 |
| Example 4 | 0.065 | 27.3 | 1890 | 11.0 | 123 |
| Example 5 | 0.177 | 27.0 | 2064 | 11.2 | 366 |
| Example 6 | 0.049 | 26.8 | 1920 | 11.0 | 95 |
| Example 7 | 0.104 | 27.0 | 1980 | 11.4 | 205 |
| Example 8 | 0.134 | 26.9 | 2067 | 11.2 | 277 |
| Example 9 | 0.198 | 26.9 | 2023 | 11.2 | 401 |
| Example 10 | 0.187 | 27.1 | 2110 | 11.5 | 395 |
| Example 11 | 0.134 | 26.9 | 2067 | 11.2 | 277 |
| Example 12 | 0.102 | 26.8 | 1860 | 11.1 | 189 |
| Comparative Example 1 | 0.247 | 26.9 | 1854 | 11.2 | 458 |
| Comparative Example 2 | 0.272 | 26.8 | 1824 | 11.1 | 497 |
| Comparative Example 3 | 0.211 | 27.0 | 2196 | 11.4 | 463 |

(2) Measuring of Volume Average Particle Diameter

The volume average particle diameters of the inkjet ink prepared in Examples and Comparative Examples were measured by UPA-EX 150, manufactured by Nikkiso Co., Ltd.

The ink was diluted with deionized water 600 times and placed in a measuring cell. The measuring was conducted at 25° C. for 60 seconds using the density of 1.40 g/ml of the pigment represented by the chemical formula 1.

The measuring results are shown in Table 5.

(3) Measuring of Color Saturation

The inkjet ink manufactured in Examples and Comparative Examples was supplied to an inkjet printer (IPSiO GX e5500, manufactured by RICOH CO., LTD.) illustrated in FIGS. 1 and 2 and a solid image was printed with one pass.

The solid image was printed on the following recording media A, B, and C. After the images were dried, the luminance thereof was measured by a reflection type color spectrodensitometer (X-Rite 938, manufactured by X-Rite Incorporate). Saturation $C^*$ was calculated by the relation: $C^*=\{(a^*)2+(b^*)2\}1/2$ from the thus-obtained values $a^*$ and $b^*$. The ratio k of the saturation value $C^*$ to the saturation value $C^*0$ of the standard color (Japan color ver. 2) was calculated by the relation: $k=C^*/C^*0$ and evaluated according to the following evaluation criteria.

The results are shown in Table 5. A and B in the evaluation criteria are preferable in the evaluation criteria.

Evaluation Sheet

Recording Sheet A: BP-PAPER GF-500 (A4, manufactured by Canon Inc.)

Recording Sheet B: MIRROR COAT Platinum (manufactured by OJI PAPER CO., LTD.)

Recording Sheet C: Crispia (manufactured by Seiko Epson Corp.)

Evaluation Criteria

A: k≥1.1

B: 1.1>k≥1.0

C, 1.0>k≥0.9

D: 0.9>k (4) Light Resistance

The inkjet ink manufactured in Examples and Comparative Examples was supplied to an inkjet printer (IPSiO GX e5500, manufactured by RICOH CO., LTD.) illustrated in FIGS. 1 and 2 and a solid image was printed with one pass.

Using the following Recording Sheet C, subsequent to printing and drying, the image was irradiated by a xenon feed meter at a black panel temperature of 63° C. for 24 hours followed by measuring the change of the image density before and after the irradiation by a reflection type color spectrodensitometer (manufactured by X-Rite Incorporated) to obtain a color deterioration ratio t (%) according to the following relation.

$t(\%)=[1-(\text{image density after irradiation})/(\text{image density before irradiation})]\times 100$ The results are shown in Table 5. A and B are preferable in the evaluation criteria.

Evaluation Sheet

Recording Sheet C: Crispia (manufactured by Seiko Epson Corp.)

Evaluation Criteria

A: t≤5%

B: 5%<t≤10%

C: 10%<t≤20%

D: 20%<t (5) Measuring of Curl

The inkjet ink was supplied to the above-described inkjet printer IPSiO GX e5500 (manufactured by Ricoh Co., Ltd.) having a structure illustrated in FIGS. 1 and 2 and a solid image was printed on the entire of an A4 sheet of the following recording sheet A with a recording density of 600 dpi×300 dpi and one pass.

The attachment amount of ink was adjusted from 300 mg/A4 to 340 mg/A4 and the image obtained 10 minutes after printing was placed on a flat desk with the image face down to measure the distance between the surface of the edge of the sheet and the reference surface by a scale.

The average of the measurement values at the right edge and the left edge of the sheet was determined as the amount of curl.

The evaluation results by the following criteria are shown in Table 5.

A and B are preferable.

Evaluation Sheet

Recording Sheet A: BP-PAPER GF-500 (A4, manufactured by Canon Inc.)

Evaluation Criteria
A: less than 5 mm
B: 5 mm to less than 20 mm
C: 20 mm to less than 50 mm
D: Both edges so curled that paper makes a cylinder-like form (6) Evaluation of Discharging Stability The inkjet ink manufactured in Examples and Comparative Examples was supplied to a printer (IPSiO Gx e5500, manufacture by RICOH CO., LTD.) having a configuration illustrated in FIGS. 1 and 2 and the discharging stability of the ink was evaluated by the following method.

In the evaluation criteria, A and B are allowable.
The results are shown in Table 5.
Evaluation Criteria
A: no streaks, no white out, no spraying disturbance observed in the solid portion
B: slight streaks, white out, spraying disturbance observed in the solid portion
C: streaks, white out, spraying disturbance observed in the solid portion
D: streaks, white out, spraying disturbance observed all over the solid portion

TABLE 5

|  | Y/X | Volume average particle diameter (nm) | Saturation (Recording sheet) | | | Light resistance | Curling | Discharging stability |
| --- | --- | --- | --- | --- | --- | --- | --- | --- |
|  |  |  | Sheet A | Sheet B | Sheet C | Sheet C | Sheet A |  |
| Example 1 | 0.134 | 89 | A | A | A | A | A | A |
| Example 2 | 0.104 | 66 | A | A | A | A | A | A |
| Example 3 | 0.102 | 122 | A | A | B | A | A | A |
| Example 4 | 0.065 | 28 | A | A | A | B | B | A |
| Example 5 | 0.177 | 45 | A | A | A | B | B | A |
| Example 6 | 0.049 | 111 | A | A | B | A | B | A |
| Example 7 | 0.104 | 155 | B | A | A | A | B | A |
| Example 8 | 0.134 | 51 | B | A | B | A | A | A |
| Example 9 | 0.198 | 105 | A | B | B | A | A | B |
| Example 10 | 0.187 | 93 | A | A | B | A | B | B |
| Example 11 | 0.134 | 162 | B | B | B | A | A | B |
| Example 12 | 0.102 | 145 | B | B | B | A | B | B |
| Comparative Example 1 | 0.247 | 98 | C | C | B | A | B | A |
| Comparative Example 2 | 0.272 | 206 | D | C | D | A | A | B |
| Comparative Example 3 | 0.211 | 137 | B | B | C | A | C | B |

Images were continuously printed for 10 minutes using the printer in which the nozzle plates described above were set. After leaving the printer at 50° C. and 60% RH for one month with a moisture retention cap on the head surface while the ink was attached thereto, the head was returned to the same state as before the leaving after cleaning the head.

Thereafter, an intermittent printing test was conducted under the following conditions and the discharging stability was evaluated.

That is, the following printing pattern chart was printed on 20 sheets continuously and printing was halt for 20 minutes. This cycle was repeated 50 times to print the chart on 1,000 sheets in total and thereafter the printing pattern chart was printed on one more sheet, which was observed with eyes to evaluate the image with regard to streaks, white out, disturbance of spraying of the following 5% chart solid portion according to the following criteria.

The printing pattern had a printing area of 5% for each color in the entire area of the sheet and was printed with each ink under 100% duty.

the printing condition was that the printing density was 600 dpi×300 dpi with one pass printing.

By using the ink composition of the present disclosure, images having high saturation can be printed on not only plain paper but also specialized gloss paper and coated paper.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink composition comprising:
a pigment represented by the following chemical formula 1;
a hydrosoluble solvent; and
water,
wherein the pigment satisfies the following relation 1:

$$0.040 < Y/X < 0.200 \qquad \text{Relation 1}$$

where, in a CuKα X-ray diffraction spectrum having a wavelength of 1.541 Å, X represents a peak intensity at a Bragg ($2\theta \pm 0.2°$) angle in a range of $2\theta$ of from 26.5° to 27.5° and Y represents a peak intensity at a Bragg ($2\theta \pm 0.2°$) angle in a range of $2\theta$ of from 11.0° to 11.5°:

Chemical formula 1

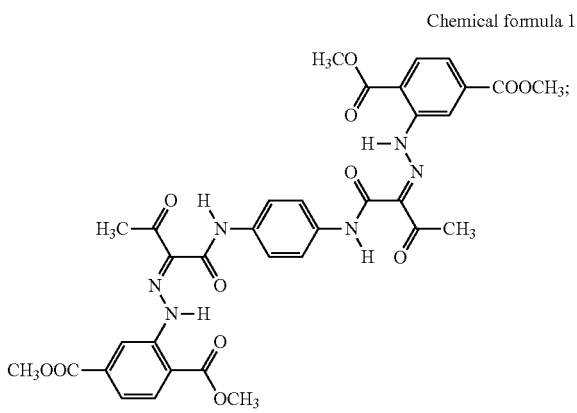

and further comprising a compound represented by the following Chemical formula 3:

Chemical formula 3

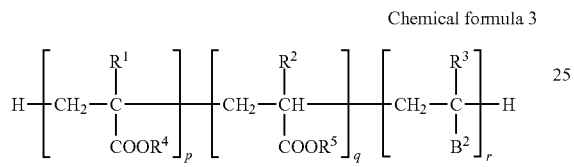

where $R^1$, $R^2$, and $R^3$ each, represent a hydrogen atom or a methyl group, $R^4$ and $R^5$ each, represent an $NH_2$ group, a benzyl group, and a stearyl group, p, q, and r each, represent integers of from 5 to 50, and $B^2$ represents a $COOM^2$ or an $SO_3M^2$, where $M^2$ represents Na, K, ammonium, tetramethyl ammonium, or ethanol amine.

2. The ink composition according to claim 1, wherein the pigment has a volume average particle diameter of from 30 nm to 150 nm.

3. The ink composition according to claim 1, further comprising a compound represented by the following Chemical formula 2:

$A^1$-O—$B^1$      Chemical formula 2 where $A^1$ represents a linear or branched alkyl group having 8 to 12 carbon atoms, a β-naphtyl group, a styrenized phenolic group, or a distyrenized phenolic group and $B^1$ represents a $COOM^1$, an $SO_3M^1$, or a $PO_3M^1{}_2$, where $M^1$ represents Na, K, tetramethyl ammonium, or ethanol amine.

4. The ink composition according to claim 1, wherein the hydrosoluble solvent comprises at least one of 3-ethyl-3-hydroxymethyl oxetane, isopropylidene glycerol, N,N-dimethyl-β-methoxy propionamide, and N,N-dimethyl-β-butoxy propionamide.

5. An inkjet recording method for an inkjet recording device, comprising:
applying mechanical energy or thermal energy to the ink composition of claim 1; and
discharging the ink composition of claim 1 from the inkjet recording device to form an image on a recording medium.

6. Inkjet printed matter comprising:
a recording medium; and
the inkjet ink of claim 1, applied to the recording medium.

7. An ink cartridge comprising:
a container; and
the ink composition of claim 1, accommodated in the container.

8. An inkjet recording device comprising:
a recording head to record on a recording medium with the ink composition of claim 1.

9. A method of manufacturing an ink composition comprising a pigment represented by the following chemical formula 1, a hydrosoluble solvent, and water, comprising:
precipitating the pigment utilizing a microreactor; and
combining the precipitated pigment with the hydrosoluble solvent and water;
wherein the pigment satisfies the following relation 1:

$0.040 < Y/X < 0.200$      Relation 1 where, in a CuKαX-ray diffraction spectrum having a wavelength of 1.541 Å, X represents a peak intensity at a Bragg (2θ±0.2°) angle in a range of 2θ of from 26.5° to 27.5° and Y represents a peak intensity at a Bragg (2θ±0.2°) angle in a range of 2θ of from 11.0° to 11.5°:

Chemical formula 1

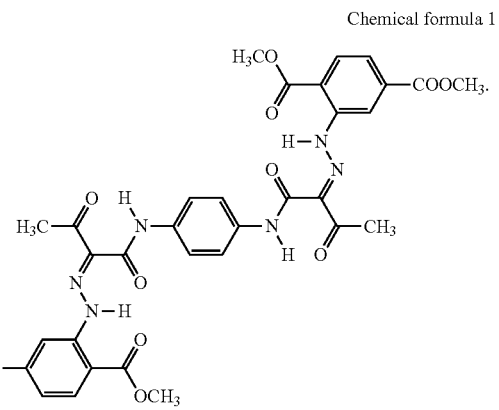

10. The method according to claim 9, wherein the pigment has a volume average particle diameter of from 30 nm to 150 nm.

11. The method according to claim 9, further comprising a compound represented by the following Chemical formula 2:

$A^1$-O—$B^1$      Chemical formula 2 where $A^1$ represents a linear or branched alkyl group having 8 to 12 carbon atoms, a β-naphtyl group, a styrenized phenolic group, or a distyrenized phenolic group and $B^1$ represents a $COOM^1$, an $SO_3M^1{}_2$, where $M^1$ represents Na, K, tetramethyl ammonium, or ethanol amine.

12. The method according to claim 9, further comprising a compound represented by the following Chemical formula 3:

Chemical formula 3

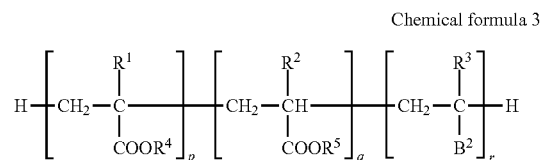

where $R^1$, $R^2$, and $R^3$ each, represent a hydrogen atom or a methyl group, $R^4$ and $R^5$ each, represent an $NH_2$ group, a benzyl group, and a stearyl group, p, q, and r each, represent integers of from 5 to 50, and $B^2$ represents a $COOM^2$ or an $SO_3M^2$, where $M^2$ represents Na, K, ammonium, tetramethyl ammonium, or ethanol amine.

13. The method according to claim 9, wherein the hydro-soluble solvent comprises at least one of 3-ethyl-3-hydroxymethyl oxetane, isopropylidene glycerol, N,N-dimethyl-P-methoxy propionamide, and N,N-dimethyl-β-butoxy propionamide.

* * * * *